US011514101B2

(12) United States Patent
Shunock et al.

(10) Patent No.: US 11,514,101 B2
(45) Date of Patent: Nov. 29, 2022

(54) SYSTEM AND METHOD FOR ANNOTATING IMAGES

(75) Inventors: Michael Stewart Shunock, Toronto (CA); Linda Arhin, Toronto (CA); Sina Sojoodi, Toronto (CA); Sherwin Kartick, Toronto (CA); Mark D'Cunha, Brampton (CA)

(73) Assignee: Michael Stewart Shunock, Toronto (CA)

( * ) Notice: Subject to any disclaimer, the term of this patent is extended or adjusted under 35 U.S.C. 154(b) by 1334 days.

(21) Appl. No.: 14/129,132

(22) PCT Filed: Jul. 5, 2012

(86) PCT No.: PCT/CA2012/050454
§ 371 (c)(1),
(2), (4) Date: Apr. 9, 2014

(87) PCT Pub. No.: WO2013/003957
PCT Pub. Date: Jan. 10, 2013

(65) Prior Publication Data
US 2014/0236720 A1    Aug. 21, 2014

Related U.S. Application Data

(60) Provisional application No. 61/612,751, filed on Mar. 19, 2012, provisional application No. 61/504,602, filed on Jul. 5, 2011.

(51) Int. Cl.
*G06F 16/58*    (2019.01)
*G06Q 30/02*    (2012.01)
(Continued)

(52) U.S. Cl.
CPC ........ *G06F 16/5866* (2019.01); *G06F 40/169* (2020.01); *G06Q 30/02* (2013.01);
(Continued)

(58) Field of Classification Search
CPC .............. G06Q 30/02; G06Q 30/0256; G06Q 30/0613; G06F 16/5866; G06F 40/169; H04N 1/32128
See application file for complete search history.

(56) References Cited

U.S. PATENT DOCUMENTS 6,092,049 A * 7/2000 Chislenko ............ H04N 21/252
                                              705/7.29
7,689,915 B2 * 3/2010 Kitamaru .............. G06F 3/0481
                                              715/224
(Continued)

FOREIGN PATENT DOCUMENTS

WO    2009085508    7/2009
WO    2010026170    3/2010

OTHER PUBLICATIONS

Neal, Diane. "Folksonomies and image tagging: Seeing the future." Bulletin of the American Society for Information Science and Technology 34.1 (2007): 7-11. (Year: 2007).*
(Continued)

*Primary Examiner* — Abhishek Vyas
*Assistant Examiner* — Monica A Mandel
(74) *Attorney, Agent, or Firm* — Bereskin & Parr LLP/S.E.N.C.R.L., s.r.l.

(57) ABSTRACT

A method and system for electronically annotating an image, or preferably, specific portions of an image, with information. In one aspect, a user may generate an image, annotate the image, and upload or otherwise disseminate the annotated image to a web page or the like. Annotations are provided as labels that provide information about the image or items therein. Further users may access the labels to access the information. The labels further enable searching and contextual advertising.

31 Claims, 15 Drawing Sheets

(51) Int. Cl.
*H04N 1/32* (2006.01)
*G06F 40/169* (2020.01)
*G06Q 30/06* (2012.01)
*G06F 40/134* (2020.01)

(52) U.S. Cl.
CPC ..... *G06Q 30/0256* (2013.01); *G06Q 30/0613* (2013.01); *H04N 1/32128* (2013.01); *G06F 40/134* (2020.01); *H04N 2201/3225* (2013.01); *H04N 2201/3249* (2013.01); *H04N 2201/3277* (2013.01)

(56) References Cited

U.S. PATENT DOCUMENTS

| | | | | |
|---|---|---|---|---|
| 7,793,211 | B2* | 9/2010 | Brenner | G06Q 30/02 715/230 |
| 9,367,850 | B2* | 6/2016 | Achlioptas | G06Q 30/02 |
| 2002/0052873 | A1* | 5/2002 | Delgado | G06Q 30/02 |
| 2003/0088457 | A1* | 5/2003 | Keil | G06Q 10/06 705/7.32 |
| 2007/0067295 | A1* | 3/2007 | Parulski | G06F 16/58 |
| 2007/0233740 | A1* | 10/2007 | Nichols | G06F 17/30038 |
| 2007/0239722 | A1* | 10/2007 | Phillips | G06F 17/30867 |
| 2008/0010263 | A1* | 1/2008 | Morton | G06F 17/30864 |
| 2008/0052151 | A1* | 2/2008 | Xie | G06Q 30/02 705/14.54 |
| 2008/0275962 | A1* | 11/2008 | Kobayashi | H04L 41/12 709/218 |
| 2008/0319844 | A1 | 12/2008 | Hua et al. | |
| 2009/0164301 | A1* | 6/2009 | O'Sullivan | G06Q 30/02 705/14.49 |
| 2010/0088170 | A1 | 4/2010 | Glore, Jr. | |
| 2011/0231747 | A1* | 9/2011 | Zuckerberg | G06F 16/5866 715/206 |
| 2011/0295848 | A1* | 12/2011 | Peters | G06F 17/30867 707/723 |
| 2012/0116871 | A1* | 5/2012 | Reis | G06Q 50/01 705/14.49 |

OTHER PUBLICATIONS

Extended European Search Report for corresponding EP Application No. 12807706.2 dated Oct. 24, 2014.
First Office Action from corresponding CN Application No. 2012800430333 dated Apr. 15, 2016.
Office Action from corresponding European Patent Application No. 12807706.2 dated Jun. 20, 2017.
Office Action from corresponding Chinese Patent Application No. 2012800430333 dated Jul. 26, 2017.

* cited by examiner

SYSTEM AND METHOD FOR ANNOTATING IMAGES

CROSS REFERENCE

Priority is claimed to U.S. patent application Ser. No. 61/504,602 filed Jul. 5, 2011 and U.S. patent application Ser. No. 61/612,751 filed Mar. 19, 2012, both of which are incorporated by reference herein.

FIELD OF THE INVENTION

The present invention relates generally to image annotation. The present invention relates more specifically to annotating images with item information.

BACKGROUND

It has long been the case that images viewable on the Internet could be linked to various web pages, including web pages corresponding to e-commerce sites.

More recently, several techniques have been proposed for enabling the tagging of images with information relating to products appearing in those images. For example, Pixazza™ allows the tagging of various portions of an image with links to various websites that may be related to such image. Other related technologies extend tagging to crowd-sourcing. Both of these approaches result in inaccuracies and delays. For example, inaccuracies may be caused by third parties tagging images in which they do not actually know the products and by incorrect links being provided for the tags. Delays can be attributed to the time taken between having taken an image to the time that third parties tag the products.

Additionally, many prior techniques do not maintain the "end-user experience" of viewing the images. For example, prior techniques typically overlay the image with dots or other image-obscuring graphics in order to signal to a user that the image is tagged. Such techniques reduce the visual aesthetics of the image.

It is an object of the present invention to obviate or mitigate at least some of the disadvantages of the known methods.

SUMMARY

In one aspect, the present invention provides a method for annotating an image, the method comprising: (a) enabling a first user of a plurality of users to access an image; (b) enabling the application of one or more labels to one or more respective items appearing in the image to create an annotated image; and (c) enabling the communication of the annotated image to a second user of the plurality of users to enable the second user to access the one or more labels.

In another aspect, the present invention provides a system for annotating an image, the system comprising a client computer operable to: (a) enable a first user of a plurality of users to access an image; (b) apply one or more labels to one or more respective items appearing in the image to create an annotated image; and (c) communicate the annotated image to a second user of the plurality of users to enable the second user to access the one or more labels.

In a further aspect, the present invention provides a method of providing contextual advertising on a web page, the method comprising: (a) providing one or more images on said web page, at least one of said images comprising one or more labels that provide a context; and (b) providing one or more advertisements on said web page, at least one of said advertisements selected based on said context.

BRIEF DESCRIPTION OF THE DRAWINGS

The features of the invention will become more apparent in the following detailed description in which reference is made to the appended drawings wherein.

DETAILED DESCRIPTION

Figure 1:
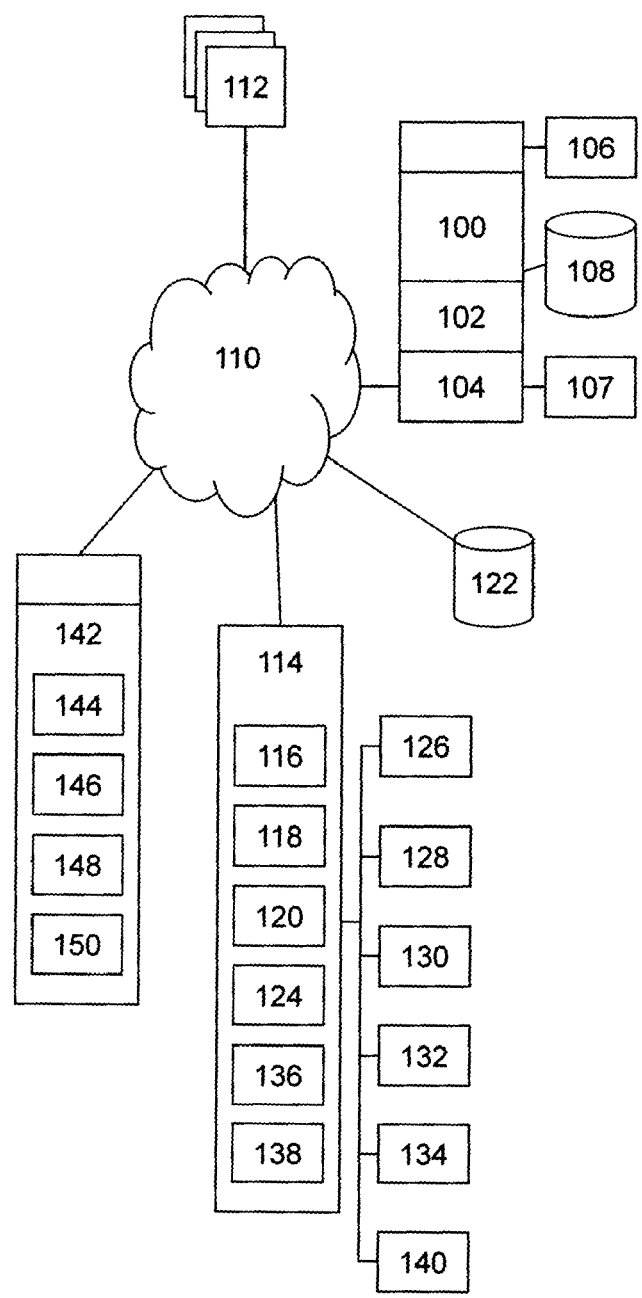
FIG. 1 is a block diagram of an image annotation system.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

In general, the present invention provides, in one aspect, a method and system for electronically annotating an image, or preferably, specific portions of an image, with information. In one aspect, a user may generate an image, annotate the image, and upload or otherwise disseminate the annotated image to a web page or the like.

In one aspect, the present invention enables a user to annotate an image comprising one or more items by associating one or more labels to a respective item. Each item may correspond to a particular area of the image. The user or an image annotation utility annotates the item by supplying item information that is associated with the label. The image can be transmitted, uploaded or otherwise communicated to other users (recipients) that can view the image and access item information by selecting the respective item in the image.

Referring to FIG. 1, an image annotation system is shown. The image annotation system comprises a network accessible server 100. The server 100 comprises a processor 102 and a memory 104. The memory 104 has stored thereon computer instructions which, when executed by the processor 102, provides an item linking utility 106 and may provide a statistical tracking utility 107.

The server 100 also includes or is linked to a database 108. The server is further linked by a network 110, such as the Internet, to a plurality of third party web sites 112.

Figure 2:
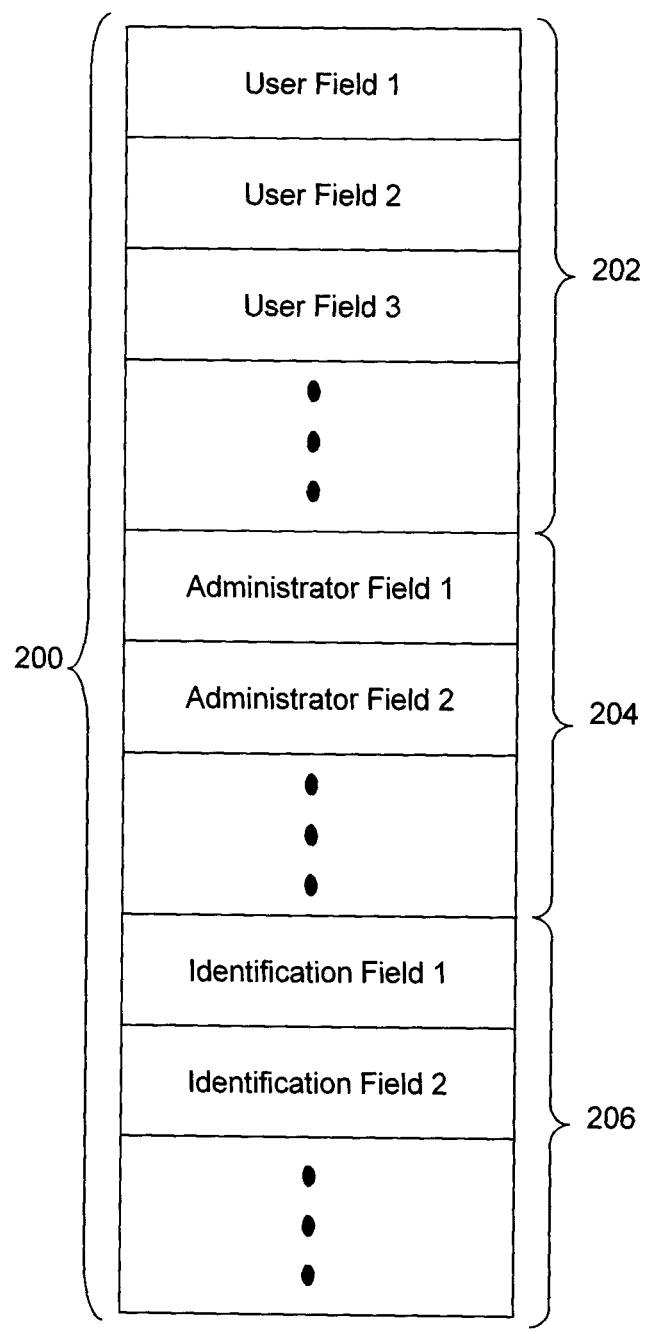
FIG. 2 is a graphical representation of an example of a record.

The database 108 includes a plurality of records, each of which comprises a plurality of fields. Referring now to FIG. 2, the fields 200 may comprise one or more user fields 202 and one or more administrator fields 204. The fields may further comprise one or more identification fields 206.

User fields are fields that may be accessed and edited by a user. User fields typically comprise fields enabling the user to describe an image and/or an item appearing therein. For example, one user field may be an item name field enabling the user to input a name of an item appearing in an image. Further user fields may comprise one or more category (including one or more subcategory, which may be hierarchical) field enabling the user to input one or more categories (or subcategories) corresponding to the item; a rating field enabling the user to input a qualitative (need vs. love vs. like vs. want vs. have, or other analogous terms, for example) or quantitative (on a scale of 1 to 5, for example) rating for an item, one or more comment fields enabling one or more users to input one or more comments regarding the item; a user location field enabling the user to input a textual description of the location at which an image was captured; a cost field enabling the user to input a cost of the item, if applicable; and a user category field to enable the user to categorize themselves relative to an item (for example, an owner of a business that produces an item in an image can categorize themselves as "business owner" for that item, while a member of the public in general could identify themselves as a "user"). The rating field could alternatively be substituted or augmented by individual fields for various qualitative measures, such as a "love" field, "like" field, "want" field and "have" field, for example. The administrator may also be able to access and edit user fields.

Administrator fields are fields that may be accessed and edited by an administrator. Administrator fields typically comprise fields enabling an administrator to describe an image and/or an item appearing therein. For example, one administrator field may be a link field enabling the administrator to input a link to a web page corresponding to an item. For example, the link may be to a web page enabling a user to purchase the item, or a web page leading to such other web page. For example, where the items are generally products that can be purchased, the administrator fields may comprise a SKU field or one or more product image fields. The cost field, previously described in the user fields, could alternatively or in conjunction be an administrator field. Other web pages that are contemplated by the image annotation system would display further information about the item, such as historical information.

By enabling users to enter only specific information corresponding to one or more specific fields (user fields), the administrator may control the particular web pages to which each item is linked. This provides increased accuracy for recipients of the image when attempting to access a web page, since an administrator can, for example, verify the accuracy of user input. This further requires less effort on the part of users to complete the fields.

It shall be appreciated that the administrator may be an individual or entity operating the server 100, or could be an automated utility executable on a server 100, a mobile device 114, a client computer 142, or another computer system.

Identification fields are used to store identifying information regarding a particular image. For example, the identification fields may comprise a user identification field to identify the user that captured an image or labelled an item; an image identification field to identify the image by an identifier; an intra-image item identification field to identify each item within the image; and a generated location field to identify the location at which the image was captured. Generally, identification fields may be generated based on automated information, such as information generated by the mobile device 114 and/or by user credentials.

The database 102 may be preloaded with a plurality of records.

Referring back to FIG. 1, in one aspect, a mobile device 114 is operable to access the server 100 by the network 110. The mobile device preferably includes a network module 116, including one or more of a cellular transceiver communicable with a cellular network that is linked to the network 110 (for example, using GPRS, WiMAX, a 3G protocol, a 4G protocol, etc.), Wi-Fi transceiver communicable with a Wi-Fi gateway linked to the network 110, Bluetooth transceiver communicable with a Bluetooth gateway linked to the network 110, or another transceiver, operable to enable the mobile device 114 to connect to the network 110.

The mobile device 114 preferably comprises a camera 118 enabling a user of the mobile device to capture images and/or video using the mobile device 114. Alternatively, the mobile device 114 includes a memory 120 to which an image can be uploaded. The memory 120 further enables images and/or video to be temporarily or permanently stored to the mobile device 114. The memory 120 may comprise a RAM, ROM, Flash, magnetic drive or other memory medium. Alternatively, the mobile device 108 may transmit images to a remote location 122, via the network module, for storage.

The mobile device 114 preferably comprises a processor 124 that is operable to execute computer instructions. The memory 120 has stored thereon computer instructions which, when executed by the processor 124, provides one or more computer applications, such as an operating system, a web browser 126, one or more user applications 128 (e.g., "apps" as they may be known), an image capture utility 130, an image annotation utility 132, an image viewing utility 134 and an analytics viewing utility 135. In this regard, the term "utility" includes a "module" or other hardware component operable to perform the functionality described herein. Furthermore, more than one of the utilities may be provided in any one such hardware component or, similarly, the various utilities could be provided on a distributed basis in a plurality of hardware components.

It will be appreciated that the mobile device 114 executes the operating system and that the operating system provides a means for launching other computer applications, including but not limited to those specified above.

The mobile device 114 additionally comprises an input/output (I/O) device 136. The I/O device 136 may comprise a keyboard, mouse, trackpad, trackball, scroll wheel, remote control, touch-screen display or other input device for obtaining input from a user of the mobile device 114. The I/O device 136 could further include a microphone 137 and a voice recognition module 139 operable to obtain input via a user's voice.

The I/O device 136 may comprise a display for providing output to the user.

In one aspect, the I/O device 136 is a touch-screen display enabling both input and output. In this regard, the use of the term "click" in the following description would include touching one or more particular points on the display. Further, the touch-screen display may be adapted for providing a virtual keyboard for obtaining input from a user.

The mobile device may further comprise a location module 138, such as a GPS module, operable to obtain location data from an external source. The location data may comprise latitude, longitude, elevation, etc.

The mobile device may further provide a search utility 140.

In another aspect, a network connected client computer 142 is operable to access the server 100. The client computer 142 has a memory 144 and a processor 146. The memory 144 has stored thereon computer instructions which, when executed by the processor 146, provides an image annotation utility 148. The image annotation utility 148 may be substantially similar in functionality to the image annotation utility 132. The client computer 142 further includes an I/O device 148, which may be any of the previously described I/O devices. The client computer 142 may, for example, be a mobile device, tablet computer, laptop computer, desktop computer, computer server, etc.

It will be appreciated that the mobile device 114 and the client computer 142 each may provide the functionality described below. For this reason, the following description describes the invention with relation to the mobile device 114, however it will be appreciated that the client computer 142 can therefore be substituted for the mobile device 114. Furthermore, the client computer 142 may further comprise a camera 150 to provide the enhanced functionality described below.

A client computer 142 provided without a digital camera and/or an image capture utility may be particularly suited for enabling third parties, that is, parties that did not capture an image, to annotate that image as described below. Such functionality may, for example, by advantageous for use by manufacturers, vendors, other interested persons, etc. that are not capturing images.

Figure 3:
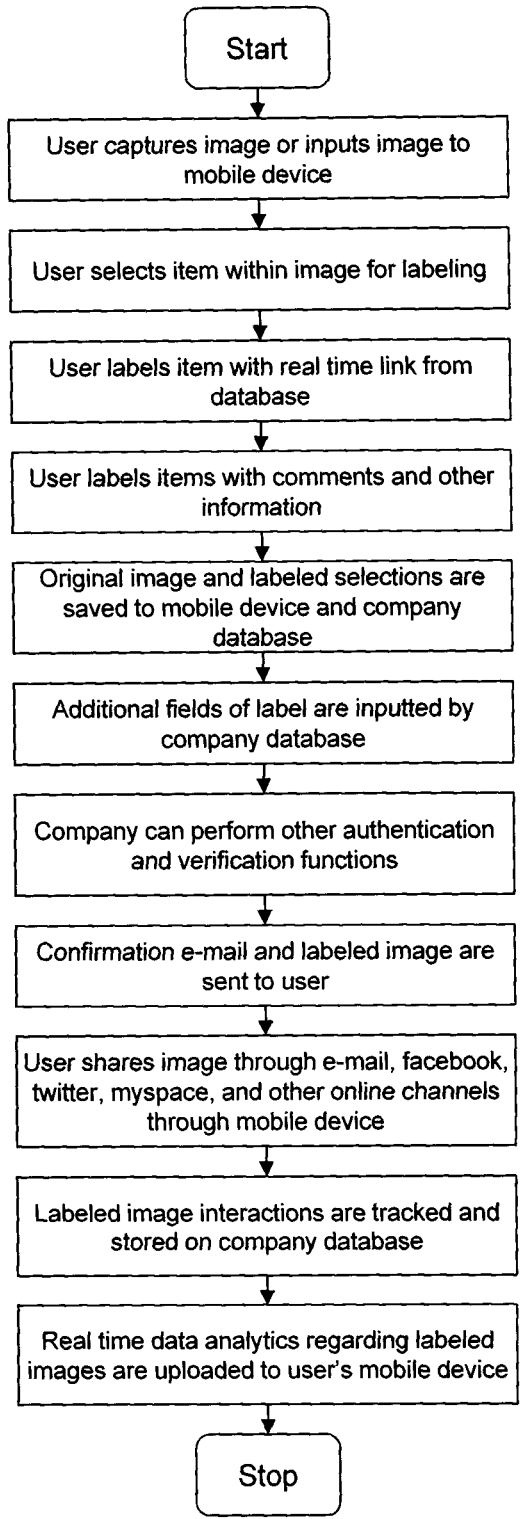
FIG. 3 is a flowchart illustrating an example use of the image annotation system.

Turning now to FIG. 3, a flowchart is shown illustrating an example embodiment of the image annotation system in use. A user operates the mobile device to launch the image capture utility. Optionally, the mobile device automatically logs in to the server to establish user credentials for the user, or requests the user to provide user credentials to the server. The user credentials may comprise a user identifier and password, and may further comprise information, including demographic information, regarding the user.

The image capture utility is operable to capture still images or video (hereinafter, collectively "images") using the digital camera of the mobile device. Alternatively, the image capture utility is operable to capture images displayed in a third party application executed on a client computer. For example, the image capture utility may be presented as a toolbar embedded within a web browser running on the client computer, wherein the toolbar accepts a user command to capture by "fetching" or "scraping" one or more images displayed on a particular webpage being displayed in the web browser.

Upon capturing an image, the image capture utility may prompt the user to save, email (or otherwise share), or perform some other operation using the image. The image capture utility may also prompt the user to launch, or may automatically launch, the image annotation utility. The image annotation utility displays the captured or stored image on the display of the mobile device.

Alternatively, rather than capturing an image, the image annotation utility may enable the user to access an image previously stored on the memory of the mobile device, the memory of the server, or a remote location. For example, a user of a client computer not equipped with a digital camera may access an image on a web page displayed on the web browser. In this particular example, the image annotation utility may be a plug-in to a web browser enabling the user to annotate any image appearing on any web page on any third party web site on the Internet.

The image annotation utility enables the user to select the image or items shown in the image for labelling. For example, the I/O device may enable the user to apply gestures to a touch-screen display to zoom the image, select items appearing in the image, etc.

In one aspect, a user selects an area of the image that corresponds to the item.

To select an item appearing in the image, for example, the user can tap a point in proximity of the item. The selected area of the image may be defined by a predetermined area surrounding the point. For example, the selected area may be defined by a circle of a predetermined radius surrounding the point. Similarly, the predetermined area could correspond to a square, rectangle or any other shape.

Alternatively, the user could draw an outline, or boundary points, on a screen, such as a touch-screen, to define the area. Further still, the user could tap a point in proximity of the item and an image processing algorithm could be used to more accurately determine the outline of the area corresponding to the item that underlies that point.

Alternatively, the user could manually select all points in the area. For example, the I/O device could display the image in greyscale and the user could repeatedly swipe along the area to be "colored in". Portions that are swiped could appear in color to illustrate to the user the area that has been selected.

Alternatively, a multi-touch gesture could be used to select the area. For example, a user could delineate two opposed corners of a rectangle to enclose the area by touching the two corners with two fingers.

Alternatively, an image processing algorithm could define and identify to the user one or more areas in the image. The user could click to select one of the areas.

Once the item has been selected, the image annotation utility applies, or enables the user to apply, one or more labels to the item. Each label may include a plurality of fields that correspond to the fields of each record in the database. The image annotation utility edits, or enables the user to access and edit, one or more of the user fields in the label.

In one aspect, the image annotation utility may edit of the user fields in the label for the item by, for example, applying image recognition to identify one or more items in an image and edit the one or more user fields for the one or more labels to each of the one or more items.

In another aspect, the image annotation utility enables the user to access and edit one or more of the user fields in the label.

The image annotation utility may communicate with the database, or a cached version thereof on the mobile device, to provide to the user a real-time listing of possible field entries for the particular user field being edited. For example, a user accessing and editing an item name field of the label may be presented with a real-time listing of possible item names to apply to that field. A real-time listing of possible field entries can be provided for any such user field.

Additionally, the image annotation utility may constrain the listing of possible field entries based on labels previously stored on the memory of the server. In specific examples, fields of a label can be considered to represent a particular hierarchy. For example, a first user field may be a retailer name and a second user field may be a product name. Thus, if the user has already entered the retailer name and is in the process of entering the product name, the possible field entries of the product name can be obtained from previously stored labels that include the specified retailer name. In other words, the retailer name is a node from which the retailer's various product names can be considered to branch.

For example, previously stored labels may indicate that retailer A has products 1, 2, 3, 4 and 5. Thus, the image annotation utility can assume that for a label specifying A as the retailer name, the possible product name entries are 1, 2, 3, 4 and 5. The image annotation utility can, therefore, present these possible field entries to the user.

The real-time listing of possible field entries may be limited to a preconfigured number of the most relevant possible field entries to the user. For example, the real-time listing may list five possible field entries to the user.

The user may provide input for each user field of the label using a virtual keyboard provided by the touch-screen display. As the user types each letter of a desired user field, the real-time listing of possible field entries may display ever-increasingly relevant field entry options to the user. For example, if the user types the letter "A", the real-time listing may display the preconfigured number of most likely field entries that begin with the letter "A". If the user next types the letter "B", the real-time listing may display the preconfigured number of field entries that begin with the letters "AB".

The user may then select one of the listed field entry options rather than manually typing the remaining portion of the desired user field.

Optionally, if the desired user field does not appear as one of the listed fields, the user can complete typing the desired field of the label.

Figure 4:
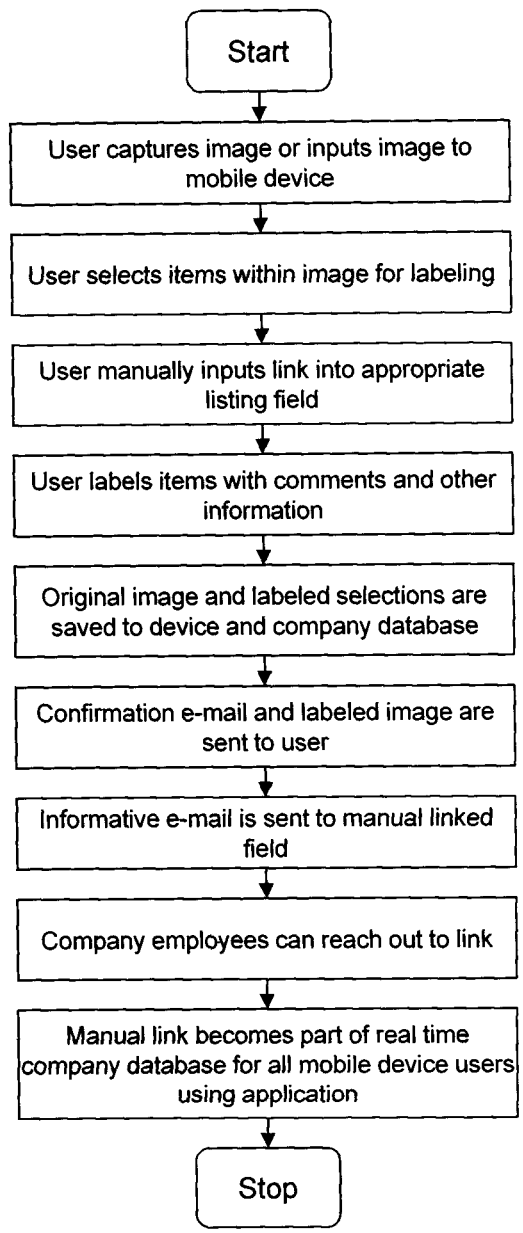
FIG. 4 is a flowchart illustrating another example use of the image annotation system.

Referring therefore to FIG. 4, a user may access an image and select from within the image an item to be labelled. The user may manually input information into one or more user fields. If the user field entry does not match to any entries for that user field previously stored on the memory of the server, the entry may be flagged for follow up on the server.

In this case, an administrator of the server can be provided with a notification that there is a flagged entry. The administrator can verify that the field entry accurately represents the item in the image. If so, the administrator may optionally establish a business relationship with a vendor or manufacturer of the item. The administrator may then complete one or more of the administrator fields to complete the label. Optionally, if a business relationship cannot be established, the administrator can delete the label, edit the label, or complete the administrator fields in such a way as to benefit some other party (such as linking the item to a competitor, for example).

Once the desired user field has been selected or inputted by the user, the user can apply the label by selecting a "save" or "apply" command in the image annotation utility.

The user may further provide input to additional user fields of the label if desired. For example, the user may input a comment for the item in a comment field. The comment may, for example, include a user-specified comment regarding the item being labelled. The user may also provide input to a user location field. The image annotation utility may be operable to determine the location, or an approximate location, at which the user is located based on location data obtained by the location module, and can correspondingly provide the user with suggested inputs based on textual representations of the location data. For example, the user annotation utility may include or be operable to access a location listing table that associates location data with textual representations of locations. In a specific example, a particular latitude and longitude may be associated with a particular retail location for an entity "XYZ", so that a user accessing the image annotation utility at that location may be provided with "XYZ" as a suggested entry to the user location field.

Optionally, the image annotation utility may provide input to one or more identification fields of the label. For example, if the particular user that is editing the user fields is associated with a user identifier, for example based on the user credentials, that user identifier may be applied to a user identification field to identify the user that captured and labelled the item.

The image annotation utility associates the label with the item in the image. For example, the image annotation utility may generate an annotation file that includes all labels in an image along with item location information for each item. The item location information may, for example, include pixel locations that define the boundaries of the item. This enables the labels to be associated with the corresponding item when the image is later accessed. In one example, a particular recipient may have received an image captured and shared by a user prior to an administrator having completed the administrator fields for one or more labelled items in that image. The image viewing utility, described more fully below, can access the annotation file from the server The annotation file may be a separate file linked to the image or could be integrated into the image file itself. In this regard, the image file may be encoded in a proprietary format.

The image annotation utility may further enable the user to label additional items in the image in a similar way. Optionally, the image annotation utility may be configured to limit the number of items that may be labelled by users for any particular image, for example for ease of accessing the labels when later viewing the image.

In a preferred aspect of the invention, the image capture utility and image annotation utility provide the ability for any particular user to both capture an image and label items in that image within a short period of time, being relatively contemporaneously. This provides timeliness, efficiency and accuracy in terms of applying the appropriate label to a corresponding item appearing in an image. As will be understood, such a time limited feature serves to reduce the likelihood of the item being labelled incorrectly, or being identified as a similar, but not exact, item. For example, while the brand of a particular item shown in an image may be ambiguous to a viewer of the image, the user capturing the image likely has increased knowledge of the name of the correct brand. In such a case, the user capturing the image is the most ideal person to apply a label to that item.

Alternatively, a plurality of different users may apply labels to various items in a single image.

Once a user has completed labelling items in the image, the user may signal to the image annotation utility that preparation of the annotated image is complete by selecting a "complete" command in the image annotation utility. The image annotation utility may store a copy of the annotated image on the memory of the mobile device and/or cause the mobile device to upload a copy of the annotated image to the server for storage on memory.

The server may generate a unique image identifier and apply the image identifier to the label. The server may also generate a unique intra-image identifier and apply the intra-image identifier to the label.

The item linking utility is operable to access each annotated image stored on the memory of the server. The item linking utility is further operable to access at least all administrator fields of each label and optionally the user fields of each label.

For example, the item linking utility may be operable to provide input to a link field for each label that links the labelled item to one or more web pages on one or more third party web sites. For example, a particular labelled item in an annotated image may be a particular brand of shoe. The user may have provided the name of the brand in the item name field of the corresponding label, using the image annotation utility. The item linking utility may be operable to link the label to a web page for purchasing that particular brand of shoe.

The item linking utility may be controlled by an administrator of the server, or could be automated. For example, an administrator may manually associate each new label of each newly uploaded annotated image with a respective web page. Alternatively, the item linking utility could interface to a search engine or a learning algorithm to automatically determine a web page that corresponds to each label.

The item linking utility could further be a hybrid of these two examples, wherein an administrator links a web page to each label having particular attributes, and the item linking utility thereafter automatically links all new labels having those attributes to that web page.

Once the annotated image has been further labelled by the item linking utility, the server stores the annotated image on the memory. The server may further send a copy of the annotated image to the mobile device of the user that labelled the image, which can replace the previously stored copy on that user's mobile device.

By enabling the item linking utility to apply administrator fields, users are not required to perform cumbersome tasks. Users are only required to apply a minimal amount of information to the user fields, sufficient to identify the particular item being labelled.

As can be observed, the user interaction enabled by the image annotation utility, along with the particular label structure disclosed herein, also enables the server to collect meaningful contextual data. The contextual data may include, for example, the particular users that are labelling particular types of items, the locations that those users are capturing and annotating images, the comments that users provide to items captured in images, and the number of different users applying labels to particular images.

The image viewing utility enables the user to access and view the annotated image, including accessing the web sites linked to that image by the one or more labels. The image viewing utility may further enable the user to share the annotated image by, for example, sending the annotated image to a recipient by SMS, email, a proprietary messaging application, through a social network, to a blog or photo sharing website, etc. For example, the image may appear on a social network "feed" along with a supporting comment or other accompanying information enabled by the social network. A user sharing an image may also share the image in a poll. For example, the user may configure a poll requesting from recipients feedback relating to the image (e.g., requesting recipients to rate the item in the image).

The user may further configure a subscription list of other users to "follow". For example, a user that is followed by another user may automatically share all images with the other user. Following may be one-way or two-way.

The image viewing utility may further provide recommended followers to a user based on matching information between the users. For example, if both users have assigned a "love" rating to a similar set of items or images, the users may be recommended as followers of each other. The particular attributes that may be considered for matching purposes could be any of the information available to the image viewing utility.

A recipient may receive the annotated image and/or an image for which annotations can be retrieved from the server. The user may select particular recipients to whom to send the image or could share the image generally. It will be appreciated that the user may be required to supply identifying information, such as an email address and password, social network credentials, etc. to enable sharing in accordance with the foregoing. The image viewing utility may retain a history of shared images.

Furthermore, the image viewing utility may enable a user to share a plurality of images simultaneously. For example, the image viewing utility may enable the user to select a plurality of images previously accessed, and configure sharing options for the set of selected images. In one example, the user may select a command to begin a selection process, select one or more images either one at a time or by selecting a set of images sharing an attribute, and select a command to share the one or more selected images. Such an implementation may reduce the number of steps a user must take when sharing a plurality of images.

The image viewing utility may enable the user to provide a comment to be sent to recipients of shared images. The image viewing utility may also enable the user to provide a qualitative rating to the image, for example, any one or more of "need", "love", "like", "want" or "have" or other analogous terms. Preferably, the image viewing utility provides to the user immediately accessible command buttons that correspond to each of "love", "like", "want" and "have". Preferably, the image viewing utility provides additional command buttons for combinations of the ratings. For example, a "both" button could indicate that the user wishes to assign both "love" and "want" ratings to an image. In a preferred combination, the image viewing utility provides immediately accessible commands for "love", "want" and "both".

The image viewing utility may further enable a user to view any of the user's images and any images shared with the user. For example, the image viewing utility may present the images sorted by category, subcategory, brand, rating, the user with which the image originated, demographic of user with which the image originated, location, or any other criteria. In a specific example, the image viewing utility may present images which have been rated by the user, or by any one or more other users, as matching one or more of the ratings, "love", "like", "want" and/or "have". Alternatively, the images that are presented to the user are those which have attained a certain number of other users assigning one or more of the ratings, "love", "like", "want" and/or "have". For example, a particular user may be shown an image that has been "loved" by ten other users. All of these features enable ease of content discovery.

The image viewing utility may display additional information with the image, such as a list or summary of users with which the image has been shared, the ratings that users have assigned to the image, comments made upon the image, etc.

The image viewing utility may further enable a user to view a profile for any other user, where the profile may correspond to the images that other user has shared and/or viewed. After viewing a profile, a user may choose to follow the user corresponding to the viewed profile.

Correspondingly, the statistical tracking utility may track sharing of the annotated image, including the medium it was shared on, the user that shared it, all users receiving the image, how many users applied further labels to the image, how many users accessed labels, and user demographics for all of the above.

The image viewing utility may enable a recipient user to access and view the annotated image, including accessing the web sites linked to that image by the one or more labels. The image viewing utility may be a standalone computer program or a plug-in to an existing image viewing program, including a web browser.

The image viewing utility may require the recipient to be a "user" prior to viewing a received image. For example, upon a recipient receiving an image and accessing the image, the image viewing utility may determine whether the recipient is a user. If the recipient is a user, the image viewing utility may display the image to the user. Otherwise, the image viewing utility may require the recipient to become a user.

The image viewing utility may be configured to preserve the user experience when viewing images, that is, by not obstructing the image with overlaid graphical representations or "pop-up" notices to show that the image includes labels.

In one aspect, an image that comprises one or more labels may be visually distinguished by a particular image border. For example, a colored image border may indicate to a user that an image comprises one or more labels.

In another aspect, an image that comprises one or more labels may be displayed without any indication that it includes labels until a user takes a predetermined action. For example, if the user performs a "mouse over" of the image, or clicks the image, the image may display the colored border, or other distinguishing feature, to indicate that it is labelled.

Alternatively, or in addition, the image viewing utility may require that a user take an action that corresponds to clicking on an item that is labelled, rather than anywhere on a labelled image, to display the distinguishing feature.

In a further aspect, an image that comprises one or more labels may be distinguished by a particular "wrapper". For example, the wrapper may be season specific. In one example, the image may be shown covered in a virtual gift wrapping during the Christmas season, covered with virtual frost during the winter season, covered in fall leaves during the fall season, etc. This approach requires the user to actively "open" the gift wrapping by untying a ribbon, for example, or to "scrape" the frost or "sweep" the leaves away, as the case may be. The wrapper may also be content-specific. For example, an image relating to a Broadway show could be covered by virtual curtains, which may need to be "opened" by the user to show the image. Other examples include break glass in case of emergency; exit doors; fog; clouds; rain on windshield and wipers; gardening and pulling back the bushes; seasonal including shoveling snow, raking leaves, washing windows; underwater and disturbed surface views; scratching tickets; pulling back tabs; unwrapping packages; power wash with hose; putting out a fire with a hose; breaking a block of ice; breaking a mirror, which may use the camera to create a mirror; sweeping dirt off the floor, pavement, desk or napkin; lifting a tablecloth; steamed mirror or glass; and sand on the beach; lifting the hood of a car. This approach may provide a sense of discovery and intrigue for a user.

The user may thereafter be shown the locations of the labelled items. In one aspect, labelled items may be displayed in a visually distinct representation. For example, labelled items could be shown in color while the remaining portions of the image are shown in greyscale. In another example, labelled items could be displayed in more vivid color while the remaining portions of the image are shown in their regular color representation. In another example, labelled items could be brightened relative to the brightness of the remaining portions of the image. Any other type of visually distinctive representation could be provided.

In another aspect, a user could be required to click on various areas of the image to determine whether there exist any labelled items in that area. Again, after clicking on a labelled item, the labelled item could be shown in color while the remaining portions of the image are shown in greyscale, or labelled items could be displayed in more vivid color while the remaining portions of the image are shown in their regular representation. Any other type of visually distinctive representation could be provided. This approach may appeal to users' curiosity.

In another aspect, the image viewing utility may provide a polygon-based representation of labelled images. A polygon may have one face displaying the image without labelled items being visually distinct, while each remaining face may display the image with a predetermined number, such as one, of the labelled items being visually distinct. For example, a cube-based representation may show one labelled item distinctly on each face, which enables the display of up to five items.

Another cube-based representation may show a front face displaying the image without labelled items being visually distinct, while a rotation of the cube may show a layered representation whereby each layer shows one labelled item being visually distinct. A user could then select one of the layers to bring that layer to the front, to further explore the particular labelled item in that layer.

Once a user has determined that an item in an image is labelled, the image viewing utility may thereafter enable the user to access that item. For example, the user could again click on the item to access that item. The image viewing utility may thereafter access the link field of the label for that item to retrieve the link corresponding to a web page for the item. The statistical tracking utility may also store to the memory various information relating to the click, including demographic information of the user, the image identifier, the item identifier, the web site that was displaying the image (if applicable) and any other relevant available information.

The statistical tracking utility may further be operable to analyze the various label information for a plurality of images to determine cross-correlated labels shown in various images. For example, the statistical tracking utility may determine that a particular item X is often shown in an image that also shows a particular item Y. Therefore, the statistical tracking utility may derive that there is a correlation between items X and Y.

The image viewing utility may be operable to launch a web browser, if for example the image viewing utility is not provided as a plug in to the web browser that is already launched, and direct the web browser to access the web page indicated by the link. Thus, the user having an interest in the item in the image can access a web page relating to that item by simply clicking the item in the image.

As previously mentioned, in one aspect, the image viewing utility may be a plug-in, or otherwise operable with, a web browser. For example, particular web site operators desiring to implement the image annotation system provided herein may display on their web sites, image content having labelled items. A user viewing these web sites, having access to the image viewing utility, may therefore access the labelled items on these web sites.

Such an implementation increases opportunities for monetization, since annotated images in accordance with the image annotation system include contextual information. For example, a web page that includes a particular image in which an item is labelled could also include contextually relevant advertising. In this example, the contextual advertising could be based, wholly or in part, on the various fields included in the image labels.

Similarly, the relationship among various labels in the image can be used to determine appropriate contextual advertisements to be displayed. For example, the statistical tracking utility may determine that a particular item X is often shown in an image that also shows a particular item Y. Therefore, if a third party web page shows an image comprising item Y, a contextual advertisement for item X may be displayed.

In this approach, a web site operator may find it particularly likely that a user accessing that web page has an interest in the type of content included in the corresponding image. In a specific example, a news web site may display a sports-related article that includes a picture of a particular athlete wearing a particular brand of sports gear, where the sports gear has been labelled with its brand name. It may be highly likely that a user accessing the article is interested in the particular sport described in the article, and is therefore highly likely to be interested in the sports gear. Therefore, other contextual advertisements displayed on the web page may be directed to other sports gear, or to other items that are known or suspected to be of interest to users that are also interested in sports gear.

This approach also provides increased opportunities for mutually benefiting the various parties involved. For example, the administrator of the server may charge the web site operator for each click of a labelled item that directs a user to a further web site, while web site operators can charge advertisers and vendors for the contextual advertisements that are related to the labelling included in an image. In other examples, the administrator and the web site operators could allocate a different split of income.

In another aspect, the administrator may partner with an image provider. The image provider, for example, may be a stock image provider that licenses images to news outlets and other interested parties. The administrator and/or image provider may annotate the images with labels to increase the contextual information in the images. The image provider can, therefore, market its images with increased effectiveness to the interested parties, as the images may increase the opportunities for the interested parties to effectively sell contextual advertising, as previously described. The administrator, meanwhile, may increase its monetization capabilities by charging a flat fee, fee-per-click, fee related to subsequent purchase, or other fee structure to the image provider.

In another aspect, persons appearing in an image may receive compensation when users access items appearing in the image. For example, an athlete, entertainer or celebrity may be shown in a particular image. It is well known that these persons influence purchase behavior in the general public. Therefore, when a user accesses a web site based on accessing a labelled item in an image the corresponding person may be provided payment. Payment may, for example, be on a fee-per-click structure.

In the various examples of a fee-per-click structure, the administrator can track how many accesses are being made by users since the statistical tracking utility tracks this information when the user navigates to that link. The tracked information may be a further opportunity for income for the administrator, since it is able to track statistics relating to the relative success of some items over others in terms of receiving clicks from users.

Furthermore, where the image viewing utility is provided on a third party web site, further user information may be obtainable. For example, if the third party collects or has access to user information, that user information could be provided to the statistical tracking utility for augmenting the collected statistical information. User information could comprise any demographic information, subscriber information (including whether the user is a subscriber or a guest), information about other web sites of interest to the user (which could be collected, for example, by determining what cookies are stored by the user's web browser or querying the web browser's history), or any other information relevant to advertisers or content providers.

Figure 5:
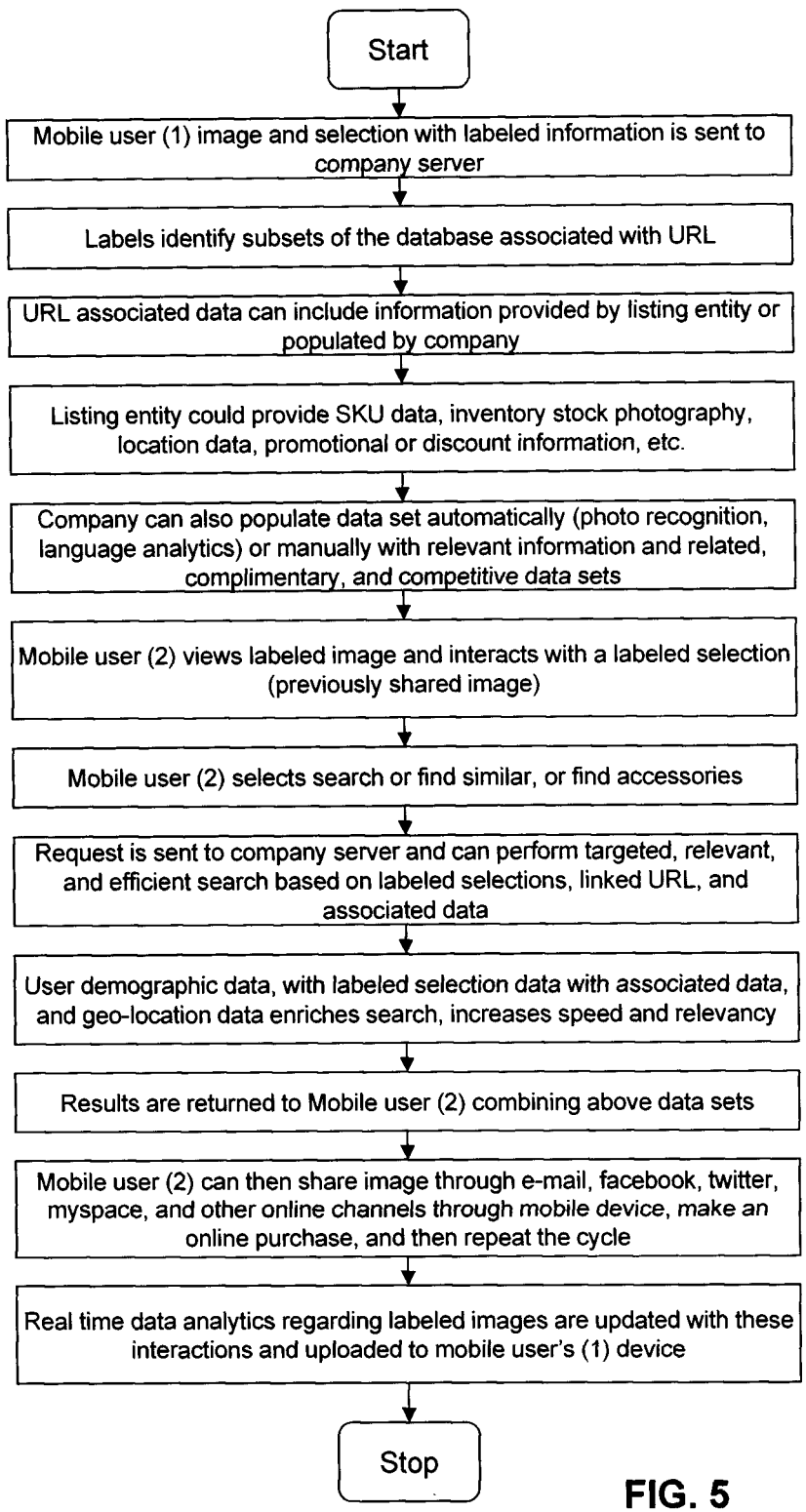
FIG. 5 is a flowchart illustrating an example use of a search utility of the image annotation system.

Referring now to FIG. 5, in another aspect, a search feature can be enabled by the search utility of the image annotation system. The search utility may be operative with a web browser or application, for example as a plug-in thereto. The search utility may enable a user to drag and drop an image into a search field of a pre-existing search engine or proprietary search engine. Alternatively, the search utility may enable a user to select a search command in connection with an image displayed by the image viewing utility. For example, a user may click on the image and/or a labelled item to display a search command.

The search utility may be configured to translate the image to one or more of the field entries in the image. The specific fields to which to translate the image can include any of the fields related to any one or more of the labelled items in the image. For example, the search utility may transform an image to an item name for one of the labelled items in that image for the purposes of performing a text-based search.

Alternatively, the search utility may be configured to search by image. For example, the search utility may return the one or more product images corresponding to the product image fields of each label in an image, or other correlated labels as determined by the statistical tracking utility.

The search utility may further enable both the image and manually entered text to be provided by a user into a search field. The relative relevance of the text and image for the search can be determined by any number of algorithms for weighting search results.

The search utility may interface with the statistical tracking utility to further consider user information of the user submitting the search and/or the one or more users that created the image or labels in the image for the purposes of returning search results.

In another aspect, the search utility may enable a user to search for items similar to those shown in a particular image. For example, one or more users may provide labels for an image as previously described. A further user, viewing the image using the image viewing utility, may select a search option provided by the image viewing utility to initiate a search of similar items to those shown in that image.

The search utility may return search results based on cross-correlations as determined by the statistical tracking utility, statistical information as determined by the statistical tracking utility and/or using any of the field entries for any of the labels in that image.

In a further aspect, the search utility may enable a user to search for information that can be derived based on the set of annotated images saved to the memory of the database. For example, a user could search for a target and the search utility may return search results that are obtained from one or more annotated images for which a field entry matches or is related to the target.

In a specific example, each annotated image may have a user location field that includes the name of a location and a generated location field that includes location data for the location. A user may search, via the search utility, for a particular location X. The search utility may be operable to locate the annotated images that were taken at the location X, and may return to the user the location data for those images. Thus, the user can obtain location data for a location based on a textual representation of the location.

Furthermore, the search utility may enable a user of a mobile device to direct a web browser to a specific web site without having to type the full web address of that web site, based partly on location. In one example, the mobile device may provide the search utility with location data obtained from the location module. The user of the mobile device could begin typing the web address for a desired web site. The search utility can select, from the set of annotated images on the memory of the server, a subset of those annotated images that include a generated location field having a value within a preconfigured proximity of the location data. Thus, images that are proximate to the user's present location are selected by the search utility.

The search utility can then collect the links in the link fields of each of the annotated images of the subset. The links, or a preconfigured number thereof, can be presented to the user as the user is typing (in a similar way to the real-time listing functionality described above), enabling the user to select one of the links rather than having to complete typing the web address. Thus, the presented links are likely to be relevant to the user since they correspond to items appearing in images that were captured in a location proximate to the user's present location.

Additionally, if the user does not select any of the presented links, those links may be removed from the presented links and further links may be presented. Alternatively, the preconfigured proximity could be repeatedly increased as the user does not select presented links while continuing to input the web address, so as to increase the number of annotated images that comprise the subset.

Similar functionality can be provided for any of the fields of the annotated images based on location data. Thus, the search utility can reduce the amount of input required by the user in any case that the input may be location dependent.

In another aspect, the image annotation system may provide analytics to users, web site operators, the administrator and advertisers. The analytics may be those previously described that are tracked by the statistical tracking utility.

The analytics viewing utility may provide a user interface that encourages user interaction. For example, the analytics viewing utility may provide the user with metrics representing how many times an image captured and/or labelled by the user has been viewed, had its labels accessed or been further shared. Any of the analytics may be used to provide a sense of ownership, competition and pride among users, which may further incentivize users to increase usage of the image annotation system.

Figure 6:
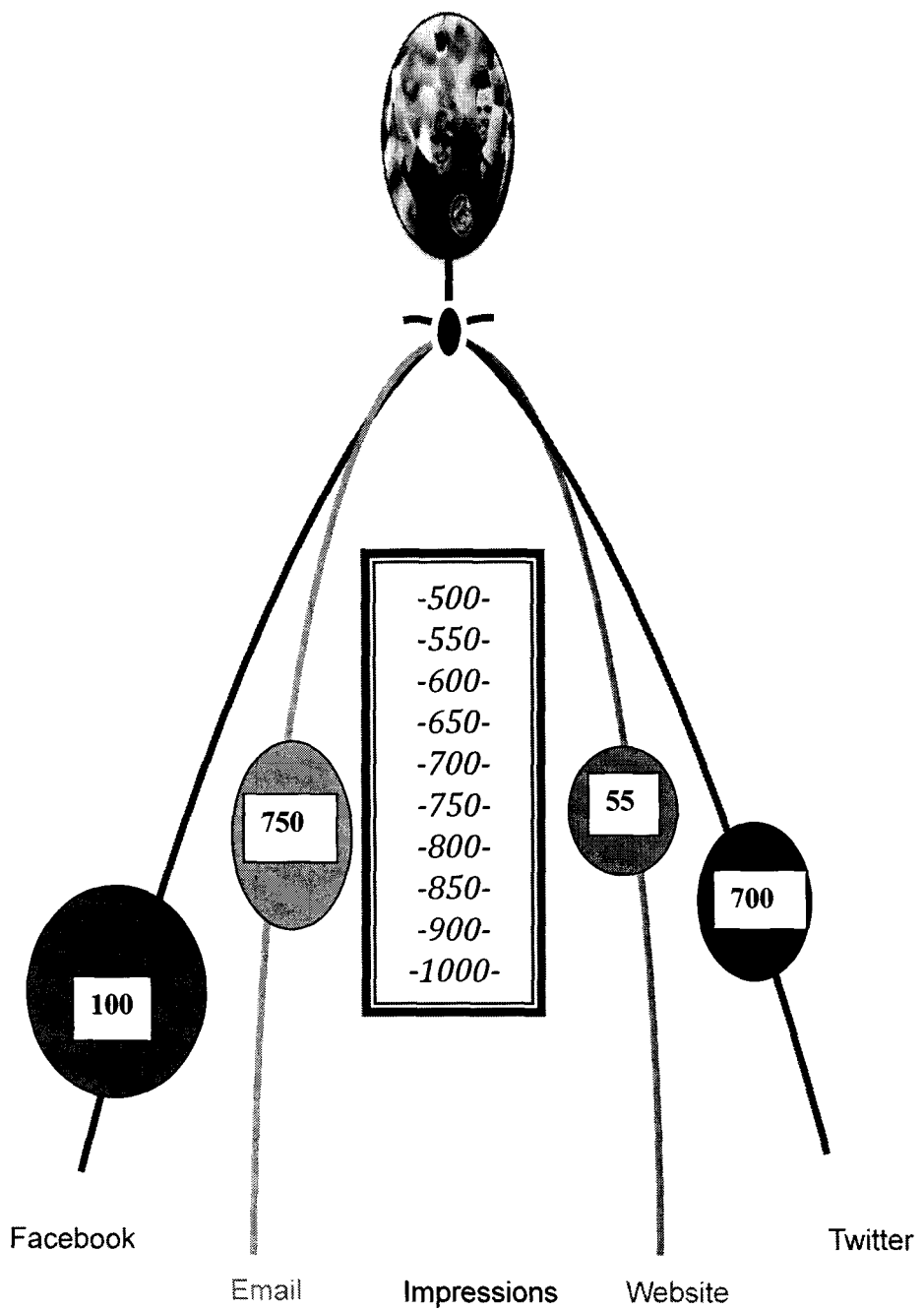
FIG. 6 is a graphical representation of a display provided by an analytics viewing utility.

Referring now to FIG. 6, the analytics viewing utility may further display to the user the number of times an image has been shared (the "number of shares") in various media, including social media, email, web sites, etc. The particular display may represent the number of shares both alphanumerically and graphically. For example, each form of media may have a "bubble", the size of which is proportional to the number of shares. A user could click on a bubble to view more specific information about sharing on that medium, such as to whom the image was shared or user demographics of the users that have shared it. This may further assist the user in determining what types of items to label in the future.

Analytics may also be viewable by other parties using the statistical tracking utility. For example, a particular party may wish to view all user comments related to a specific brand that is specified in the item name field of all labels.

Parties may further be able to view user demographics of users that are interested in particular brands, based on which users have been labelling items with those brands. Parties may correspondingly offer those particular users, or users having similar user demographics, with particular offers and promotions for those brands.

The particular display may represent the number of shares both alphanumerically and graphically. For example, each form of media may have a "bubble", the size of which is proportional to the number of shares. A user could click on a bubble to view more specific information about sharing on that medium, such as to whom the image was shared or user demographics of the users that have shared it. This may further assist the user in determining what types of items to label in the future.

Figure 7:
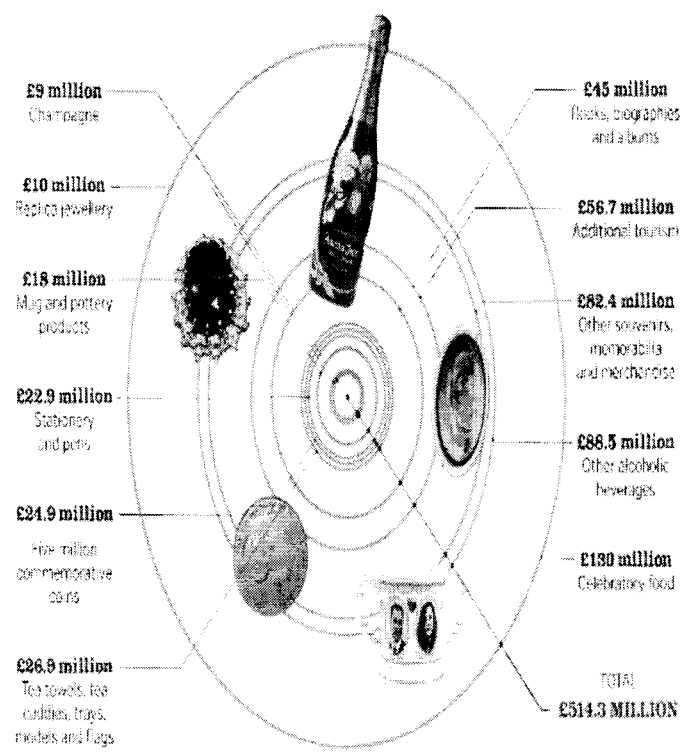
FIG. 7 is another graphical representation of a display provided by an analytics viewing utility.
Figure 8:
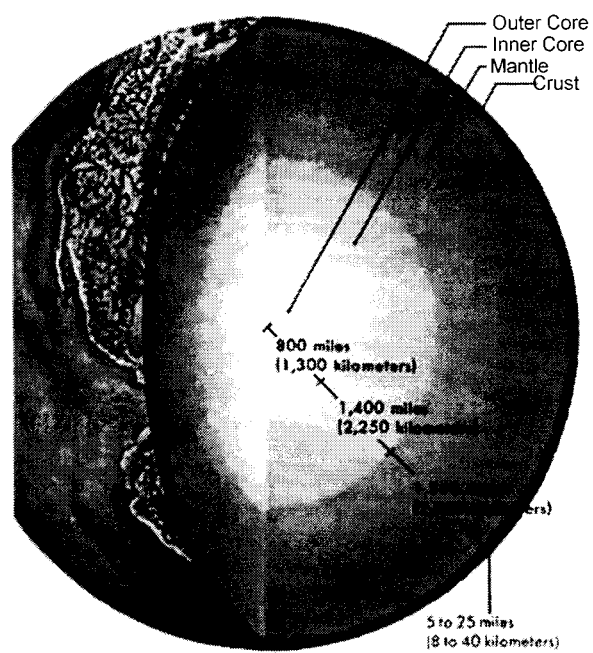
FIG. 8 is a further graphical representation of a display provided by an analytics viewing utility.

Referring now to FIGS. 7 and 8, the analytics viewing utility may also display to the user the number of times an image has been shared in various media, including social media, email, web sites, etc. using an illustration showing the image as a core, and each form of media as concentering rings or layers. The distance between the image and each ring, or the thickness of the layer from the image, may represent the amount of instances the image has been shared on that medium or the percentage of total shares that can be attributed to that medium. Each ring or layer may further be depicted in a particular color to enable the user to distinguish between the various media.

Figure 9:
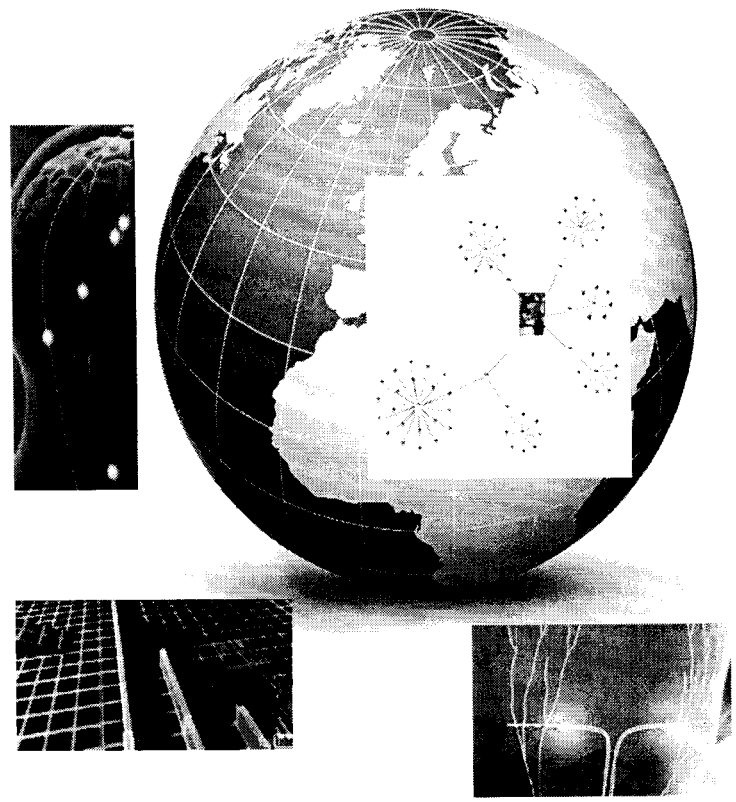
FIG. 9 is yet another graphical representation of a display provided by an analytics viewing utility.

Parties may further be interested in understanding the locations of users that are interested in particular brands. Referring to FIG. 9, a user interface for viewing location information for users related to an image is shown. The image may be shown on a globe representation, at approximately the location the image was taken. Branches can extend from the image to points around the globe that the image was shared, labelled, or accessed. Further branches can be shown pertaining to similar information. This may be useful, for example, for advertisers to understand where brands may be popular.

Referring now to FIG. 10, the analytics viewing utility may provide an illustration of sharing interface through an animated map interface. Sharing may be provided for images comprising any particular item, items comprising a category, items comprising a brand and/or all items and can be broken down by shares among all users, shares among followers, and shares among any category of users. FIGS. 10(a) and 10(b) illustrate the sharing interface comprising a "slider" which may enable a user to visualize the sharing of the item(s) over time, beginning at the first share of the item(s) until the present time. A sharing graph may be located proximate the slider for illustrating the number of shares that occurred in a given timeframe. The graph may be a histogram depicting the number of times the image is shared in a set of predetermined intervals (such as minutes, hours, days, etc.).

Figure 10B:
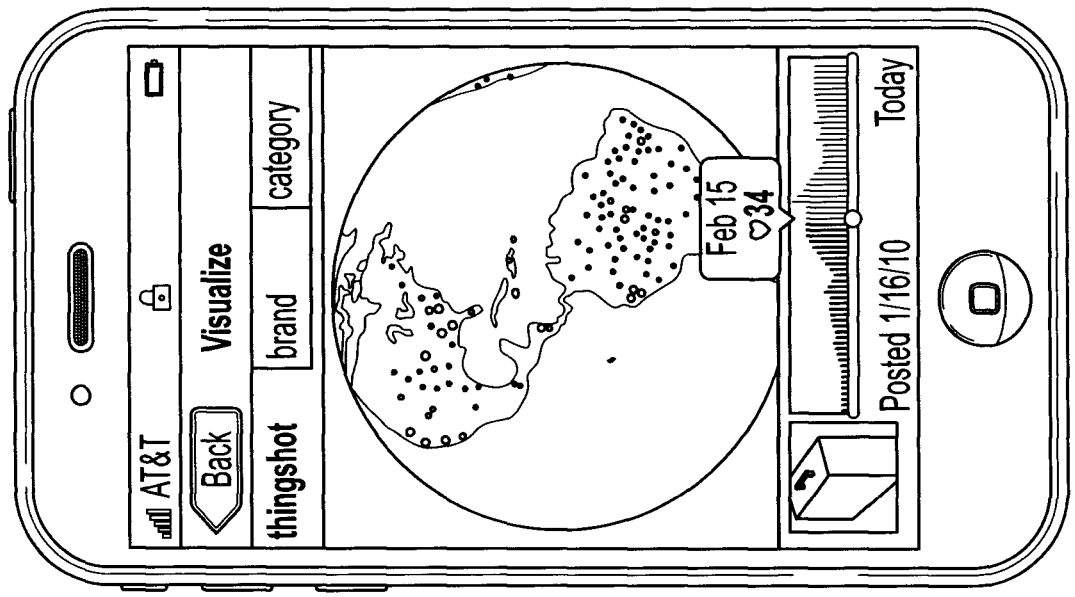
FIG. 10 is yet another graphical representation of a display provided by an analytics utility.
Figure 10A:
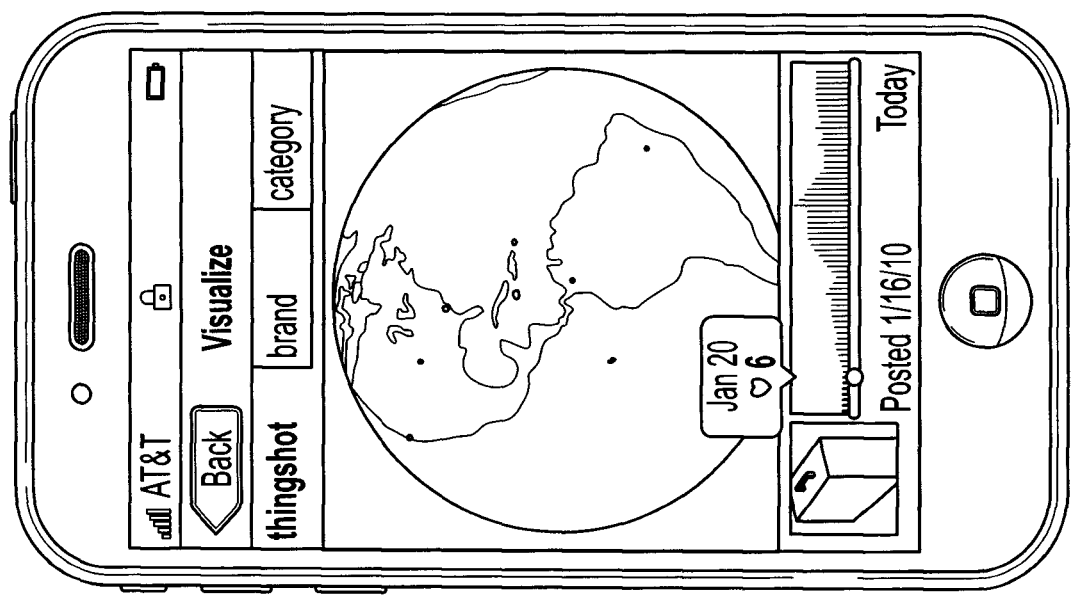
Figure 10D:
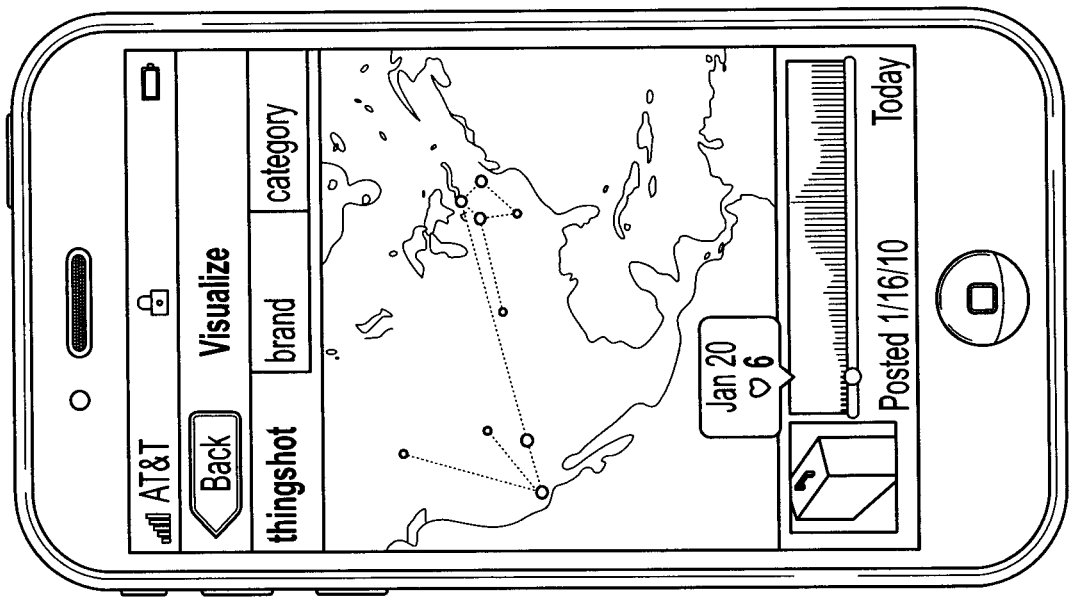
Figure 10C:
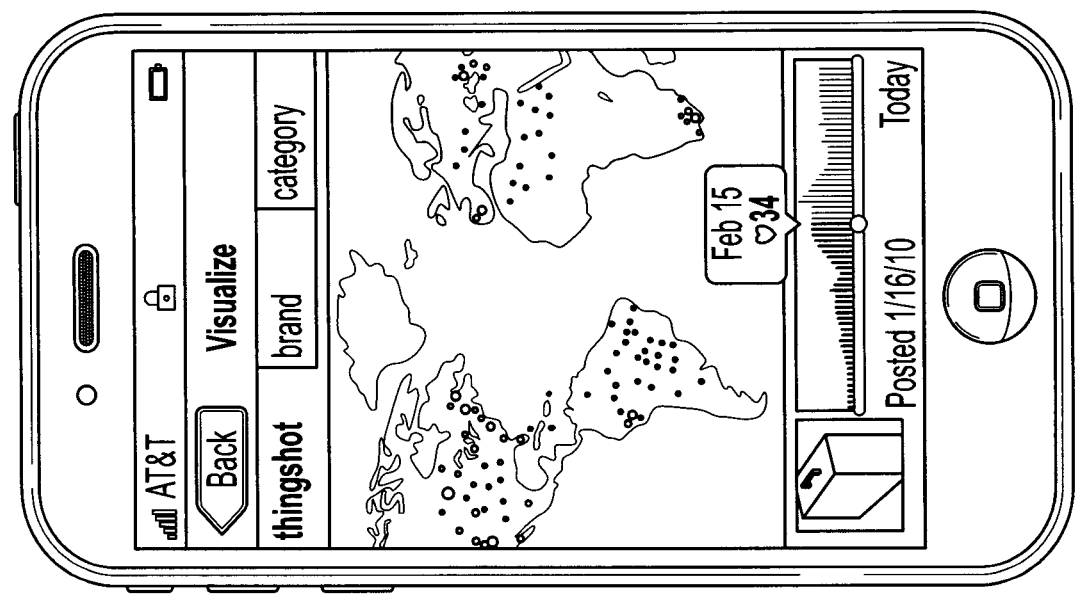
Figure 11B:
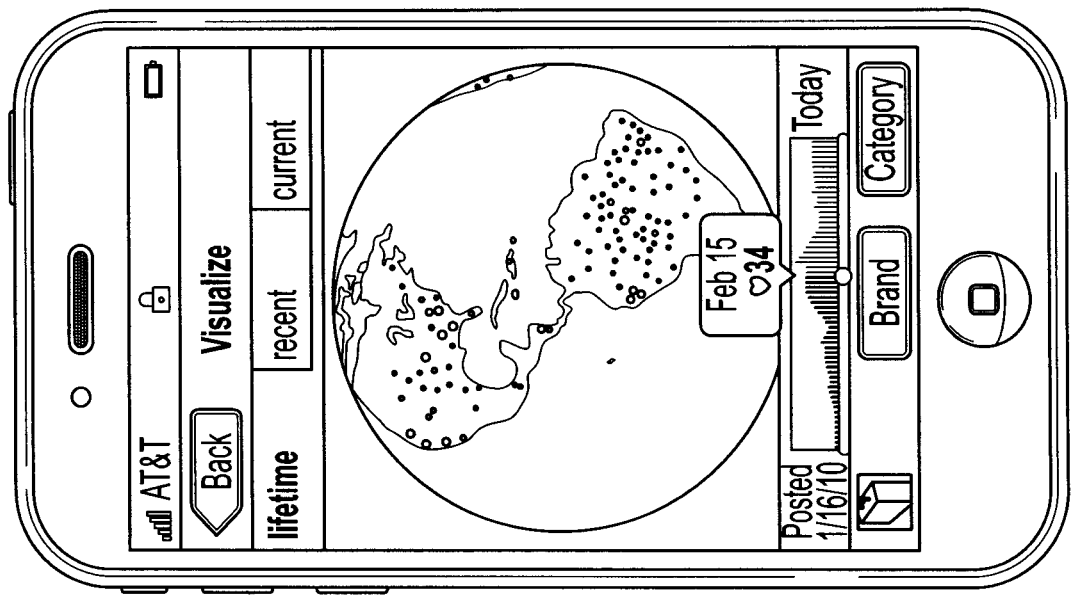
FIG. 11 is yet another graphical representation of a display provided by an analytics utility.
Figure 11A:
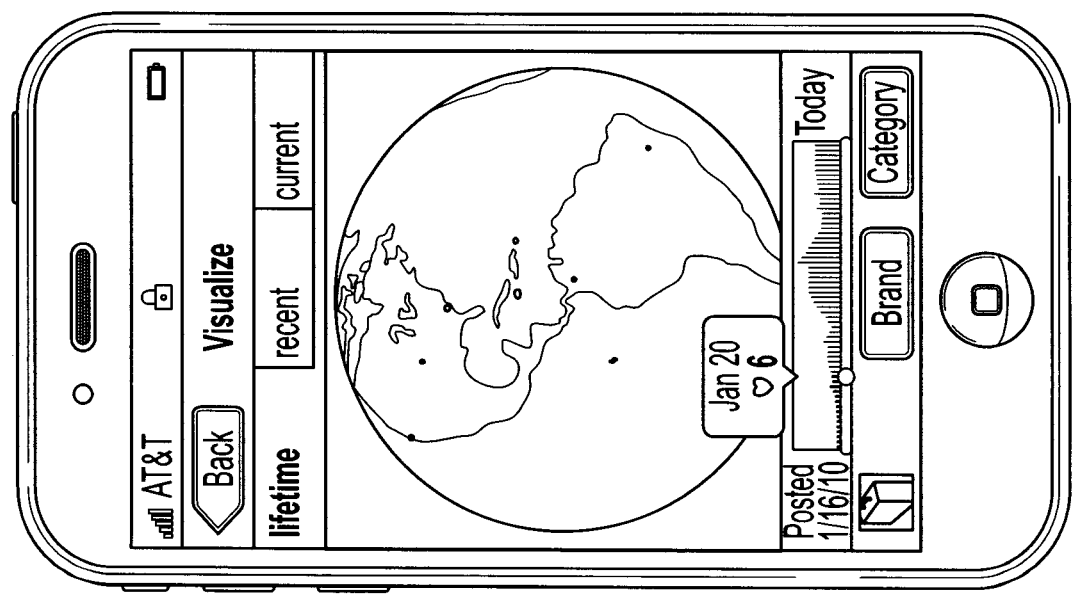
Figure 11D:
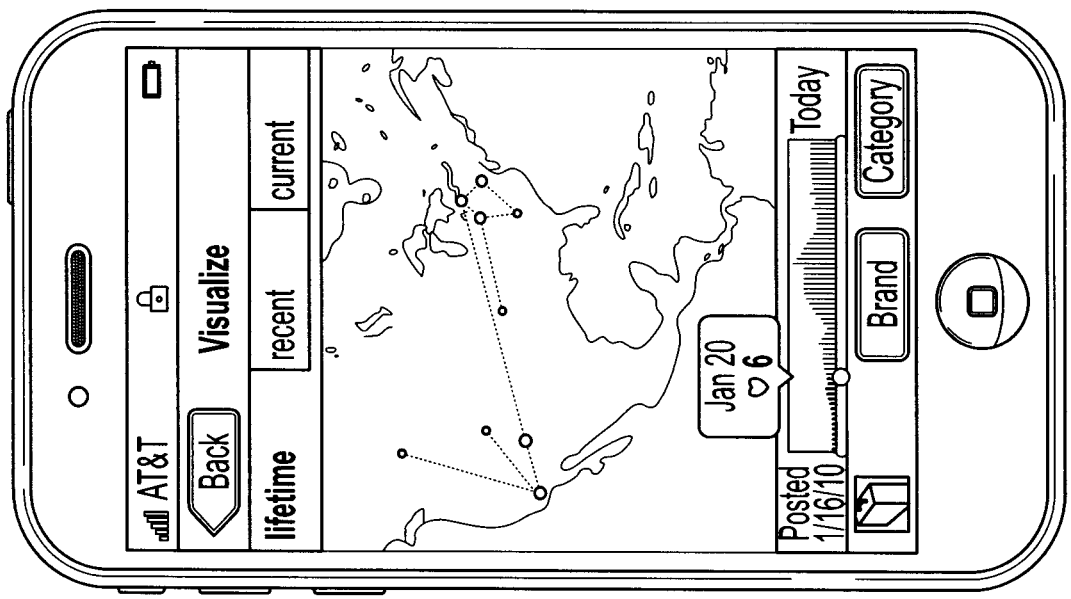
Figure 11C:
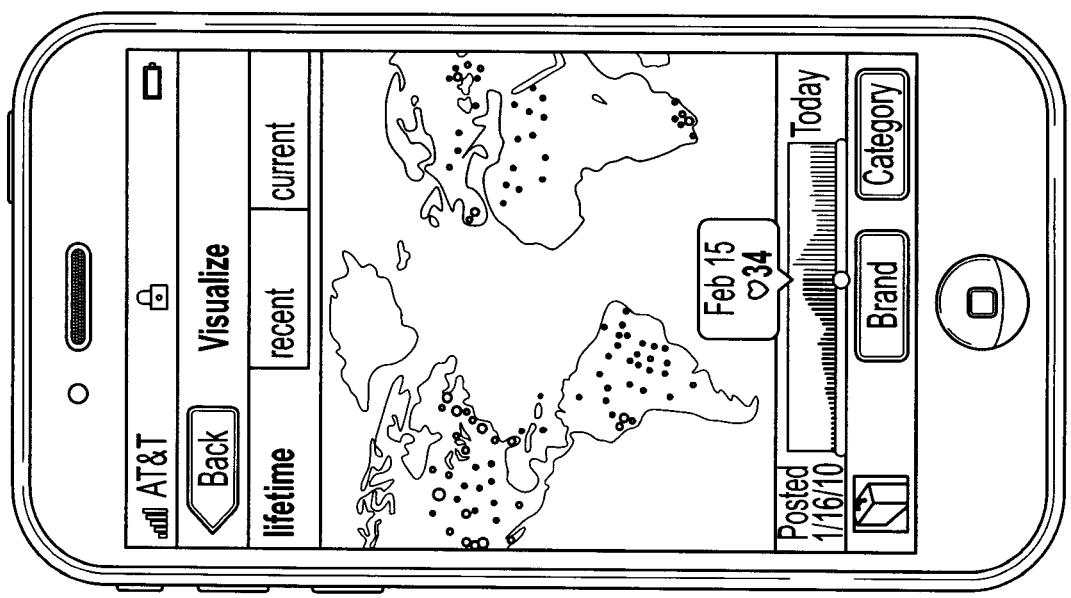

As shown in FIG. 10(c), as the slider advances over time, the locations at which an image has been shared may be highlighted on the map temporarily, until the slider has advanced further. Locations from and to which the image has been shared may also be linked by lines, as shown in FIG. 10(d). Users may zoom in or pan the map using gestures, such as pinch-to-zoom and flick.

Referring now to FIG. 11, the animated map interface may be provided for various timeframes rather than by category, etc. Timeframes may, for example, be lifetime (from the first share of the image to the present time), recent (which may be a preconfigured or user-defined timeframe) and current (which may also be a preconfigured or user-defined timeframe).

Additionally, the first share (or first post) and one or more of the most particular shares (e.g, a recent share) of an image may be highlighted on the map by one or more distinct colored indicator. The distinct colors may also be shown on the graph proximate the slider, to illustrate the time associated with a particular colored indicator.

The animated map interface could also change color based on the purpose of the mapping (time-based or item based, for example).

Figure 12:
FIG. 12 is yet another graphical representation of a display provided by an analytics viewing utility.
Figure 13:
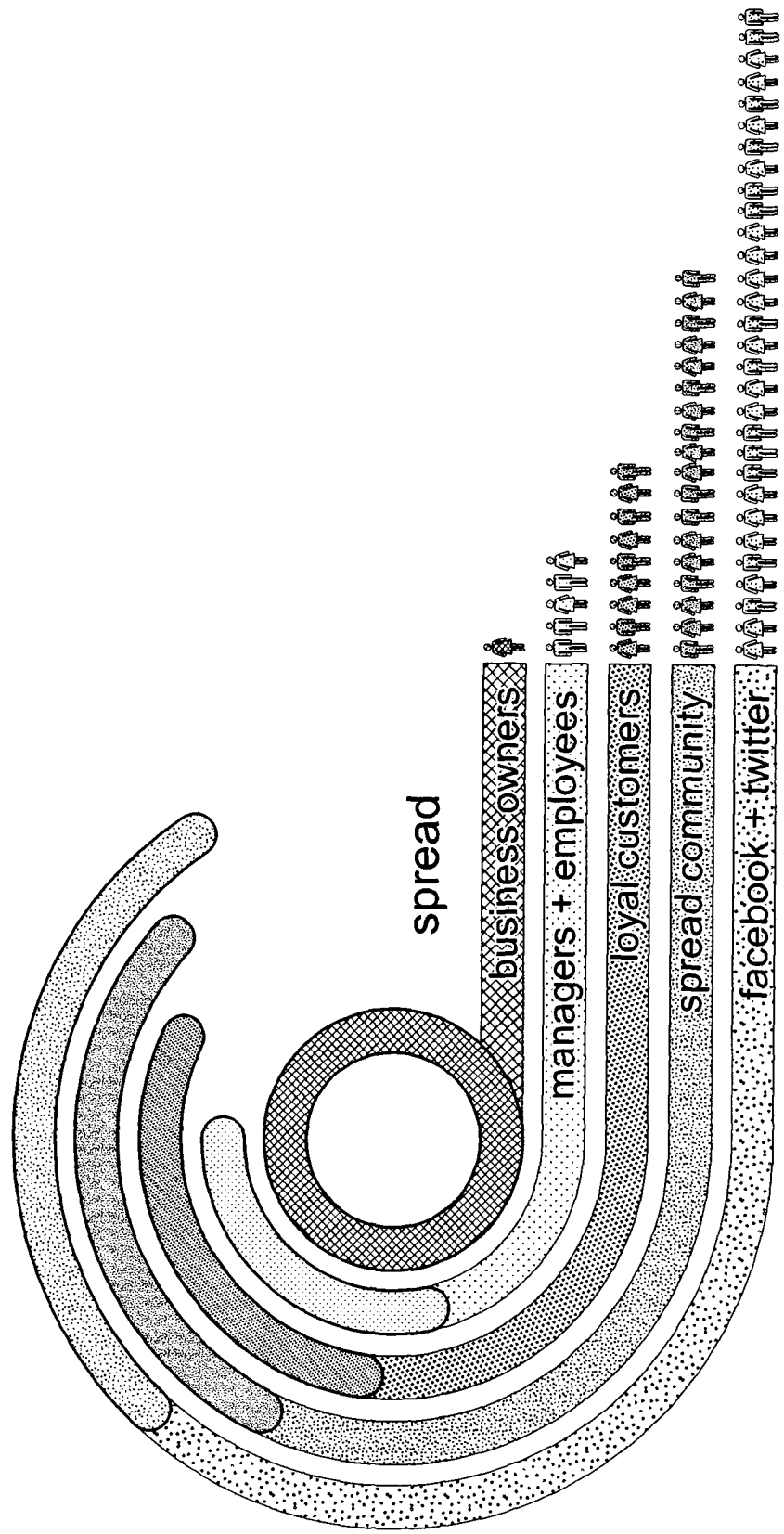
FIG. 13 is yet another graphical representation of a display provided by an analytics viewing utility.

Referring now to FIGS. 12 and 13, the analytics viewing utility may be operable to provide a graphical illustration of dissemination of a particular item or image, or set of items or images. For example, the graphical illustration may provide dissemination based on item name, or any one or more user field or administrative field.

The graphical illustration may further provide dissemination broken down by the type of user to whom the item or image has been disseminated. For example, as shown in FIGS. 12 and 13, the graphical illustration is broken down by social networking users, users of the image annotation system, users that have identified themselves as loyal customers of a particular business that is related to the item or image, managers and employees of that business, and owners of the business. It will be appreciated that any number or name of category can be provided.

It will further be appreciated that the graphical illustrations of FIGS. 12 and 13 may provide information related to ratings, such as any of the various qualitative measures that can be associated with images in items. For example, the graphical illustration can illustrate the number and types of users that "love" an item or image; or that "want" an item or image.

Additionally, as shown in the graphical illustrations depicted in FIGS. 12 and 13, the graphical depiction of dissemination may comprise a plurality of concentric arcs, which may comprise circles or ovals, each representing a type of user. In the depiction shown, the central arc is a circle representing a business owner, while each subsequent larger concentric arc represents a plurality of users that are an additional degree removed from a particular item. In other words, business owners would be assumed to be the most passionate about an item though there are relatively few users in this category, while managers and employees are next most passionate, and so on, up to social networking users in general, which are generally the least passionate but having the most users in the category. Therefore, the particular graphical illustrations shown in FIGS. 12 and 13 are particular effective in providing an illustration of how passionate each category is about an item or image, in such a way as to "radiate" from the core of the illustration where the passion is highest.

Other depictions of dissemination may be provided in a pyramid, inverted pyramid, or other stacked shape that may represent hierarchy and/or order.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A system for annotating an image, the system comprising a server having a processor and a memory, the server being configured to communicate with a first computing device operated by a first user of a plurality of users and a second computing device operated by a second user of the plurality of users, the first computing device having a first display screen and a first-user input device and the second computing device having a second display screen and a second-user input device, the server further being configured to provide instructions to the first computing device and the second computing device to configure the first computing device to display a plurality of images on the first display screen, each image of the plurality of images showing one or more items, each image of the plurality of images being displayed with at least one set of command buttons, each set of command buttons including a plurality of command buttons, the plurality of command buttons corresponding to a plurality of distinct ratings representing a plurality of selectable qualitative relationships between each user and a particular item of the one or more items, the plurality of command buttons, the plurality of distinct ratings and the plurality of selectable qualitative relationships being the same for each image of the plurality of images, each rating in the plurality of distinct ratings being different from the other ratings in the plurality of distinct ratings, and each selectable qualitative relationship in the plurality of selectable qualitative relationships being different from the other selectable qualitative relationships in the plurality of selectable qualitative relationships, such that i) each command button of the plurality of command buttons corresponds to a distinct rating in the plurality of distinct ratings, the distinct rating representing a selectable qualitative relationship in the plurality of selectable qualitative relationships, and ii) at least two command buttons are selectable by each user, wherein each of the at least two command buttons correspond to different distinct ratings representing at least two different qualitative relationships, and a third command button is selectable, wherein the third button corresponds to a combination of at least two of the different distinct ratings represented by the two command buttons;

configure the first computing device to display, for a first item shown in a first image of the plurality of images, the plurality of command buttons associated with the first item, each command button of the plurality of command buttons associated with the first item being selectable using the first-user input device;

associate a first first item rating field with the first item shown in the first image in response to the first user selecting at least one command button from the plurality of command buttons associated with the first item to select at least one qualitative relationship between the first user and the first item, using the first-user input device, the at least one command button corresponding to at least one first first item rating, the first first item rating field comprising information for identifying the at least one first first item rating;

configure the first computing device to display, for a second item shown in the first image of the plurality of images, the plurality of command buttons associated with the second item, each command button of the plurality of command buttons associated with the second item being selectable using the first-user input device;

associate a first second item rating field with the second item shown in the first image in response to the first user selecting at least one command button from the plurality of command buttons associated with the second item to select at least one qualitative relationship between the first user and the second item, using the first-user input device, the at least one command button corresponding to at least one first second item rating, the first second item rating field comprising information for identifying the at least one first second item rating;

configure the second computing device to display the first image on the second display screen, and to display, for the first item shown in the first image, the plurality of command buttons associated with the first item, each command button of the plurality of command buttons associated with the first item being selectable using the second-user input device;

associate a second first item rating field with the first item in response to the second user selecting at least one command button from the plurality of command buttons associated with the first item to select at least one qualitative relationship between the second user and the first item, using the second-user input device, the at least one command button corresponding to at least one second first item rating, the second first item rating field comprising information for identifying the at least one second first item rating;

configure the second computing device to display, for the second item shown in the first image, the plurality of command buttons associated with the second item shown in the first image, each command button of the plurality of command buttons associated with the second item being selectable using the second-user input device;

associate a second second item rating field with the second item in response to the second user selecting at least one command button from the plurality of command buttons associated with the second item to select at least one qualitative relationship between the second user and the second item, using the second-user input device, the at least one command button corresponding to at least one second second item rating, the second second item rating field comprising information for identifying the at least one second second item rating; and determine a correlation for each item shown in each image of the plurality of images, the correlation comprising an image identifier, an intra-image item identifier, the first rating field associated with the item, an identifier corresponding to the first user, the second rating field associated with the item, and an identifier corresponding to the second user wherein the correlation is searchable based on at least one of the first rating field or the second rating field, wherein at least one of the first rating field or the second rating field includes the combination of the at least two different distinct ratings.

2. The system of claim 1, wherein the server is further configured to store on the memory a first item first-image record comprising the correlation, the server being further configured to receive the correlation;

store the correlation in the first item first-image record; and associate the first item first-image record with the first image such that the first image is identifiable and retrievable from memory based on the associated first item first-image record and the associated first item first-image record is identifiable and retrievable from memory based on the first image.

3. The system of claim 2, wherein at least one of the first item and the second item shown in the first image corresponds to a purchasable product, and the first item first-image record further comprises at least one of an item-name field comprising information for identifying a brand of the item shown in the first image and a category field comprising information for identifying a category of the item shown in the first image.

4. The system of claim 3, wherein the first item first-image record further comprises a first-user identification field and a second-user identification field, the server being further configured to receive from the first computing device in response to the first user selecting the at least one command button, the identifier corresponding to the first user for distinguishing the first user from other users of the plurality of users;

receive from the second computing device in response to the second user selecting the at least one command button, the identifier corresponding to the second user for distinguishing the second user from other users of the plurality of users; and store the identifier for distinguishing the first user in the first-user identification field and the identifier for distinguishing the second user in the second-user identification field.

5. The system of claim 4, wherein the identifier corresponding to the first user is linked to each of the first first item rating field and the first second item rating field such that the first first item rating field and the first second item rating field can be identified and distinguished from other rating fields based on the identifier corresponding to the first user, and wherein the identifier corresponding to the second user is linked to each of the second first item rating field and the second second item rating field such that the second first item rating field and the second second item rating field can be identified and distinguished from other rating fields based on the identifier corresponding to the second user.

6. The system of claim 4, wherein
the memory is configured to store the plurality of images and a plurality of image item records comprising the first item first-image record, each item shown in each image of the plurality of images being associated with an image item record of the plurality of image item records such that the image showing the item is identifiable and retrievable from memory based on the one or more associated image item records and the one or more associated image item records are identifiable and retrievable from memory based on that image,
for each image of the plurality of images, each of the one or more associated image item records comprising a plurality of fields, the plurality of fields comprising one or more user identification fields, one or more rating fields, and at least one of an item-name field and a category field, wherein
each user identification field of the one or more user identification fields comprises information for distinguishing a user of the plurality of users from other users of the plurality of users,
each rating field of the one or more rating fields comprises information for identifying a rating corresponding to a command button of the plurality of command buttons associated with each image of the plurality of images,
the item-name field comprises information for identifying a brand of an item shown in that image,
the category field comprises information for identifying a category of the item shown in that image, and
each user identification field of the one or more user identification fields is linked to one or more respective rating fields of the one or more rating fields such that each rating field of the one or more respective rating fields can be identified and distinguished from other rating fields of the one or more rating fields based on that user identification field;
the server is further configured to
communicate with a third computing device having a third display screen;
receive a search command from the third computing device, the search command defining a search target;
for each image item record of the plurality of image item records, search in
each user identification field of the one or more user identification fields,
each rating field of the one or more rating fields, and
at least one of the item-name field and the category field,
for information satisfying the search target;
for each image item record of the plurality of image item records having one or more fields comprising information satisfying the search target,
identify and retrieve an image associated with that image item record from the memory, and
provide instructions to the third computing device to configure the third computing device to display on the third display screen the image associated with that image item record.

7. The system of claim 6, wherein the information for satisfying the search target comprises the information for identifying at least one of the first first item rating and the first second item rating, and the identifier for distinguishing the first user from other users of the plurality of users, and
the server is further configured to,
for each image item record of the plurality of image item records, search in
each user identification field of the one or more user identification fields, and
each rating field of the one or more rating fields, for the information satisfying the search target;
identify and retrieve the first image based on the first item first-image record; and
provide instructions to the third computing device to configure the third computing device to display on the third display screen at least the first image.

8. The system of claim 6, wherein the first item first-image record comprises the item-name field and the information for satisfying the search target comprises information for identifying the brand of the first item shown in the first image, and
the server is further configured to,
for each image item record of the plurality of image records, search in the item-name field for the information for satisfying the search target;
identify and retrieve the first image based on the first item first-image record; and
provide instructions to the third computing device to configure the third computing device to display on the third display screen at least the first image.

9. The system of claim 6, wherein the first item first-image record comprises the category field and the information for satisfying the search target comprises information for identifying the category of the item shown in the first image, and
the server is further configured to,
for each image item record of the plurality of image item records, search in the category field for the information for satisfying the search target;
identify and retrieve the first image based on the first-image record; and
provide instructions to the third computing device to configure the third computing device to display on the third display screen at least the first image.

10. The system of claim 6, wherein the server is further configured to:
associate an additional first first item rating field with the first item shown in the first image in response to the first user selecting from the plurality of command buttons associated with the first image, using the first-user input device, an additional at least one command button different from the at least one command button and corresponding to an additional first first item rating different from the first first item rating, the additional first first item rating field comprising information for identifying the additional first first item rating;

associate an additional second first item rating field with the first image in response to the second user selecting from the plurality of command buttons associated with the first image, using the second-user input device, an additional at least one command button different from the at least one command button corresponding and to an additional second first item rating different from the second first item rating, the additional second first item rating field comprising information for identifying the additional second first item rating;

communicate with a third computing device having a third display screen.

11. The system of claim 4, wherein the server is further configured to track and store on the memory information regarding the first user;

communicate with a third computing device having a third display screen; and in response to receiving a request from the third computing device to provide analytics regarding the first image, retrieve from the memory the first item first-image record, distinguish the first user from other users of the plurality of users based on the first-user identification field, retrieve from the memory the information regarding the first user, and provide instructions to the third computing device to configure the third computing device to display on the third display screen analytics derived based on the first item first-image record and the information regarding the first user.

12. The system of claim 11, wherein the information regarding the first user comprises information for determining a location at which the first user is located, and the analytics derived based on the first item first-image record and the information regarding the first user comprise a graphical map interface visually indicating the location at which the first user is located.

13. The system of claim 11, wherein the information regarding the first user comprises information for determining a number of computing devices operated by respective users of the plurality of users to which the first computing device communicated the first image.

14. The system of claim 11, wherein the information regarding the first user comprises information for identifying to which computing devices operated by respective users of the plurality of users the first computing device communicated the first image, and the information for distinguishing the second user and the information for identifying each of the second-user first item rating and the second-user second item rating, if and only if the server receives the information for identifying each of the second-user first item rating and the second-user second item rating from the second computing device subsequent to the server identifying that the first computing device communicated the first image to the second computing device.

15. The system of claim 1, wherein the server is further configured to instruct the first computing device to display only one image of the plurality of images on the first display screen at a time, such that when the one image is the first image, no other images are concurrently displayed and the plurality of command buttons associated with one of the first item and the second item shown in the first image are accessible at the time.

16. A method for annotating an image using an image annotation system, the image annotation system comprising a server having a processor and a memory, the method comprising:

configuring the server to communicate with a first computing device operated by a first user of a plurality of users and a second computing device operated by a second user of the plurality of users, the first computing device having a first display screen and a first-user input device and the second computing device having a second display screen and a second-user input device;

operating the server to instruct the first computing device to display a plurality of images on the first display screen, each image of the plurality of images showing one or more items, each image of the plurality of images being displayed with at least one set of command buttons, each set of command buttons including a plurality of command buttons, the plurality of command buttons corresponding to a plurality of distinct ratings representing a plurality of selectable qualitative relationships between each user and a particular item of the one or more items, the plurality of command buttons, the plurality of distinct ratings and the plurality of selectable qualitative relationships being the same for each image of the plurality of images, each rating in the plurality of distinct ratings being different from the other ratings in the plurality of distinct ratings, and each selectable qualitative relationship in the plurality of selectable qualitative relationships being different from the other selectable qualitative relationships in the plurality of selectable qualitative relationships, such that i) each command button of the plurality of command buttons corresponds to a distinct rating in the plurality of distinct ratings, the distinct rating representing a selectable qualitative relationship in the plurality of selectable qualitative relationships, and ii) at least two command buttons are selectable by each user, wherein each of the at least two command buttons correspond to different distinct ratings representing at least two different qualitative relationships, and a third command button is selectable, wherein the third button corresponds to a combination of at least two of the different distinct ratings represented by the two command buttons; and display, for a first item shown in a first image of the plurality of images, the plurality of command buttons associated with the first item, each command button of the plurality of command buttons associated with the first item being selectable using the first-user input device;

display, for a second item shown in a first image of the plurality of images, the plurality of command buttons associated with the second item, each command button of the plurality of command buttons associated with the second item being selectable using the first-user input device;

associating a first first item rating field with the first item shown in the first image in response to the first user selecting at least one command button from the plurality of command buttons associated with the first item to select at least one qualitative relationship between the first user and the first item, using the first-user input device, the at least one command button corresponding to at least one first first item rating, the first first item rating field comprising information for identifying the at least one first first item rating;

associating a first second item rating field with the second item shown in the first image in response to the first user selecting at least one command button from the plurality of command buttons associated with the second item to select at least one qualitative relationship between the first user and the first item, using the first-user input device, the at least one command button corresponding to at least one first second item rating, the first second item rating field comprising information for identifying the at least one first second item rating;

operating the server to instruct the second computing device to display the first image on the second display screen, and to display, for the first item shown in the first image, the plurality of command buttons associated with the first item, each command button of the plurality of command buttons associated with the first item being selectable using the second-user input device;

associating a second first item rating field with the first image in response to the second user selecting at least one command button from the plurality of command buttons associated with the first image to select at least one qualitative relationship between the second user and the first item, using the second-user input device, the at least one command button corresponding to at least one second rating, the second first item rating field comprising information for identifying the at least one second first item rating;

operating the server to instruct the second computing device to display, for the second item shown in the first image, the plurality of command buttons associated with the second item, each command button of the plurality of command buttons associated with the second item being selectable using the second-user input device;

associating a second second item rating field with the first item in response to the second user selecting at least one command button from the plurality of command buttons associated with the first item to select at least one qualitative relationship between the second user and the second item using the second-user input device, the at least one command button corresponding to at least one second second item rating, the second second item rating field comprising information for identifying the at least one second second item rating; and determining a correlation for each item shown in each image of the plurality of images, the correlation comprising an image identifier, an intra-image item identifier, the first rating field associated with the item, an identifier corresponding to the first user, the second rating field associated with the item, and an identifier corresponding to the second user wherein the correlation is searchable based on at least one of the first rating field or the second rating field, wherein at least one of the first rating field or the second rating field includes the combination of the at least two different distinct ratings.

17. The method of claim 16, the method further comprising storing on the memory the correlation;
receiving at the server the correlation;
storing the correlation in the first first item image-record; and
associating the first item first-image record with the first image such that the first image is identifiable and retrievable from memory based on the associated first item first-image record and the associated first item first-image record is identifiable and retrievable from memory based on the first image.

18. The method of claim 17, wherein at least one of the first item and the second item shown in the first image corresponds to a purchasable product, and the first item first-image record further comprises at least one of an item-name field comprising information for identifying a brand of the item shown in the first image and a category field comprising information for identifying a category of the item shown in the first image.

19. The method of claim 18, wherein the first item first-image record further comprises a first-user identification field and a second-user identification field, the method further comprising receiving at the server from the first computing device in response to the first user selecting the at least one command button, the identifier corresponding to the first user for distinguishing the first user from other users of the plurality of users;

receiving at the server from the second computing device in response to the second user selecting the at least one command button, the identifier corresponding to the second user for distinguishing the second user from other users of the plurality of users; and storing the identifier for distinguishing the first user in the first-user identification field and the identifier for distinguishing the second user in the second-user identification field.

20. The method of claim 19, wherein the identifier corresponding to the first user is linked to each of the first rating field and the first second item rating field such that the first first item rating field and the first second item rating field can be identified and distinguished from other rating fields based on the identifier corresponding to the first user, and wherein the identifier corresponding to the second user is linked to each of the second first item rating field and the second second item rating field such that the second first item rating field and the second second item rating field can be identified and distinguished from other rating fields based on the identifier corresponding to the second user.

21. The method of claim 19, the method further comprising storing on the memory the plurality of images and a plurality of image item records comprising the first item first-image record, each item shown in each image of the plurality of images being associated with an image item record of the plurality of image item records such that the image showing the item is identifiable and retrievable from memory based on the associated one or more image item records and the associated one or more image item records are identifiable and retrievable from memory based on that image, for each image of the plurality of images, each of the one or more associated image item records comprising a plurality of fields, the plurality of fields comprising one or more user identification fields, one or more rating fields, and at least one of an item-name field and a category field, wherein each user identification field of the one or more user identification fields comprises information for distinguishing a user of the plurality of users from other users of the plurality of users, each rating field of the one or more rating fields comprises information for identifying a rating corresponding to a command button of the plurality of command buttons associated with each image of the plurality of images, the item-name field comprises information for identifying a brand of an item shown in that image, the category field comprises information for identifying a category of the item shown in that image, and each user identification field of the one or more user identification fields is linked to one or more respective rating fields of the one or more rating fields such that each rating field of the one or more respective rating fields can be identified and distinguished from other rating fields of the one or more rating fields based on that user identification field;

configuring the server to communicate with a third computing device having a third display screen;

receiving at the server a search command from the third computing device, the search command defining a search target;

for each image item record of the plurality of image item records, searching in
each user identification field of the one or more user identification fields,
each rating field of the one or more rating fields, and
at least one of the item-name field and the category field,
for information satisfying the search target;

for each image item record of the plurality of image item records having one or more fields comprising information satisfying the search target,
identifying and retrieving an image associated with that image item record from the memory; and
operating the server to instruct the third computing device to display on the third display screen the image associated with that image item record.

22. The method of claim 21, wherein the information for satisfying the search target comprises the information for identifying at least one of the first first item rating and the first second item rating, and the identifier for distinguishing the first user from other users of the plurality of users, the method further comprising,
for each image item record of the plurality of image item records, searching in
each user identification field of the one or more user identification fields, and
each rating field of the one or more rating fields,
for the information satisfying the search target;
identifying and retrieving the first image based on the first item first-image record; and
operating the server to instruct the third computing device to display on the third display screen at least the first image.

23. The method of claim 21, wherein the first item first-image record comprises the item-name field and the information for satisfying the search target comprises information for identifying the brand of the first item shown in the first image, the method further comprising,
for each image item record of the plurality of image records, searching in the item-name field for the information for satisfying the search target;
identifying and retrieving the first image based on the first item first-image record; and
operating the server to instruct the third computing device to display on the third display screen at least the first image.

24. The method of claim 21, wherein the first item first-image record comprises the category field and the information for satisfying the search target comprises information for identifying the category of the item shown in the first image, the method further comprising,
for each image item record of the plurality of image item records, searching in the category field for the information for satisfying the search target;
identifying and retrieving the first image based on the first-image record; and
operating the server to instruct the third computing device to display on the third display screen at least the first image.

25. The method of claim 19, the method further comprising
tracking and storing on the memory information regarding the first user;
configuring the server to communicate with a third computing device having a third display screen; and
in response to receiving a request at the server from the third computing device to provide analytics regarding the first image,
retrieving from the memory the first item first-image record,
distinguishing the first user from other users of the plurality of users based on the first-user identification field,
retrieving from the memory the information regarding the first user, and
operating the server to instruct the third computing device to display on the third display screen analytics derived based on the first item first-image record and the information regarding the first user.

26. The method of claim 25, wherein the information regarding the first user comprises information for determining a location at which the first user is located, and the analytics derived based on the first item first-image record and the information regarding the first user comprise a graphical map interface visually indicating the location at which the first user is located.

27. The method of claim 25, wherein the information regarding the first user comprises information for determining a number of computing devices operated by respective users of the plurality of users to which the first computing device communicated the first image.

28. The method of claim 25, wherein the information regarding the first user comprises
information for identifying to which computing devices operated by respective users of the plurality of users the first computing device communicated the first image, and
the information for distinguishing the second user and the information for identifying each of the second-user first item rating and the second-user second item rating, if and only if the server receives the information for identifying each of the second-user first rating and the second-user second rating from the second computing device subsequent to the server identifying that the first computing device communicated the first image to the second computing device.

29. The method of claim 16, the method further comprising operating the server to instruct the first computing device to display only one image of the plurality of images on the first display screen at a time, such that when the one image is the first image, no other images are concurrently displayed and the plurality of command buttons associated with one of the first item and the second item shown in the first image are accessible at the time.

30. The method of claim 16, wherein the first first item rating and the second first item rating are the same.

31. A system for annotating an image, the system comprising a server having a processor and a memory, the server being configured to communicate with a first computing device operated by a first user of a plurality of users and a second computing device operated by a second user of the plurality of users, the first computing device having a first display screen and a first-user input device and the second computing device having a second display screen and a second-user input device, the server further being configured to provide instructions to the first computing device and the second computing device to configure the first computing device to display a plurality of images on the first display screen, each image of the plurality of images being displayed with a plurality of command buttons, the plurality of command buttons corresponding to a plurality of distinct ratings representing a plurality of selectable qualitative relationships between each user and the image, the plurality of command buttons, the plurality of distinct ratings and the plurality of selectable qualitative relationships being the same for each image of the plurality of images, each rating in the plurality of distinct ratings being different from the other ratings in the plurality of distinct ratings, and each selectable qualitative relationship in the plurality of selectable qualitative relationships being different from the other selectable qualitative relationships in the plurality of selectable qualitative relationships, such that i) each command button of the plurality of command buttons corresponds to a distinct rating in the plurality of distinct ratings, the distinct rating representing a selectable qualitative relationship in the plurality of selectable qualitative relationships, and ii) at least two command buttons are selectable by each user, wherein each of the at least two command buttons correspond to different distinct ratings representing at least two different qualitative relationships, and a third command button is selectable, wherein the third button corresponds to a combination of at least two of the different distinct ratings represented by the two command buttons;

configure the first computing device to display, for a first image of the plurality of images, the plurality of command buttons associated with the first image, each command button of the plurality of command buttons associated with the first image being selectable using the first-user input device, wherein at least one labelled item is shown in the first image, and each labelled item in the at least one labelled item is associated with a corresponding label;

configure the first computing device to display, for the first image, the corresponding label for a first at least one of the labelled items in the at least one labelled item in response to detecting a first predetermined action by the first user, wherein the first computing device is configured to display the first image without displaying any indication of the corresponding label prior to detecting the first predetermined action;

associate a first rating field with the first image in response to the first user selecting at least one command button from the plurality of command buttons associated with the first image to select at least one qualitative relationship between the first user and the first image, using the first-user input device, the at least one command button corresponding to at least one first rating, the first rating field comprising information for identifying the at least one first rating;

configure the second computing device to display the first image on the second display screen, and to display, for the first image, the plurality of command buttons associated with the first image, each command button of the plurality of command buttons associated with the first image being selectable using the second-user input device;

configure the second computing device to display, for the first image, the corresponding label for a second at least one of the labelled items in the at least one labelled item in response to detecting a second predetermined action by the second user, wherein the second computing device is configured to display the first image without displaying any indication of the corresponding label prior to detecting the second predetermined action;

associate a second rating field with the first image in response to the second user selecting at least one command button from the plurality of command buttons associated with the first image to select at least one qualitative relationship between the second user and the first image, using the second-user input device, the at least one command button corresponding to at least one second rating, the second rating field comprising information for identifying the at least one second rating; and determine a correlation for each labelled item in the first image, the correlation comprising an image identifier, the first rating field, an identifier corresponding to the first user, the second rating field, and an identifier corresponding to the second user wherein the correlation is searchable to detect other labels that correspond to each labelled item, wherein at least one of the first rating field or the second rating field includes the combination of the at least two different distinct ratings.

* * * * *